(12) United States Patent
Kondo et al.

(10) Patent No.: US 6,546,139 B1
(45) Date of Patent: Apr. 8, 2003

(54) CODING APPARATUS AND METHOD, DECODING APPARATUS AND METHOD, DATA PROCESSING SYSTEM, STORAGE MEDIUM, AND SIGNAL

(75) Inventors: Tetsujiro Kondo, Tokyo (JP); Kenji Tanaka, Chiba (JP); Yoshinori Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/412,832

(22) Filed: Oct. 5, 1999

(30) Foreign Application Priority Data

Oct. 7, 1998 (JP) .......................... 10-285310
Oct. 5, 1999 (JP) .......................... 11-284198

(51) Int. Cl.[7] ................................................. G06K 9/36
(52) U.S. Cl. ...................... 382/232; 713/176; 235/375
(58) Field of Search .................... 382/232; 713/176; 356/239.1; 235/375

(56) References Cited

U.S. PATENT DOCUMENTS

| 5,144,663 A | 9/1992 | Kudelski et al. .............. 380/16 |
| 6,034,766 A | * 3/2000 | Sugiura et al. .......... 356/239.1 |
| 6,334,187 B1 | * 12/2001 | Kadono ...................... 713/176 |

FOREIGN PATENT DOCUMENTS

| EP | 0 762 764 | 3/1997 | .......... H04N/7/167 |
| EP | 0 838 785 | 4/1998 | .......... G06T/11/00 |
| FR | 2 631 192 | 11/1989 | .......... H04N/7/167 |
| WO | WO 99 10837 | 3/1999 | ............ G06K/9/36 |

* cited by examiner

*Primary Examiner*—Anh Hong Do
(74) *Attorney, Agent, or Firm*—Frommer Lawrence & Haug LLP; William S. Frommer; Glenn F. Savit

(57) ABSTRACT

The invention relates to a coding apparatus for embedding second data into first data without deterioration of the first data, and a decoding apparatus for decoding the coded data to the original first data and the second data without deterioration. The invention provides the coding apparatus which includes a memory for storing at least partial data of the first data and embeds the second data into the first data by performing rotation of the at least partial data stored in the memory in accordance with the second data; and provides the decoding apparatus in which at least partial data of the coded data embedded with the second data is rotated and a correlation with respect to peripheral data is calculated, so that the original first data and the second data are decoded in accordance with a rotation amount determined on the basis of the correlation.

26 Claims, 17 Drawing Sheets

IMAGE TRANSMISSION SYSTEM

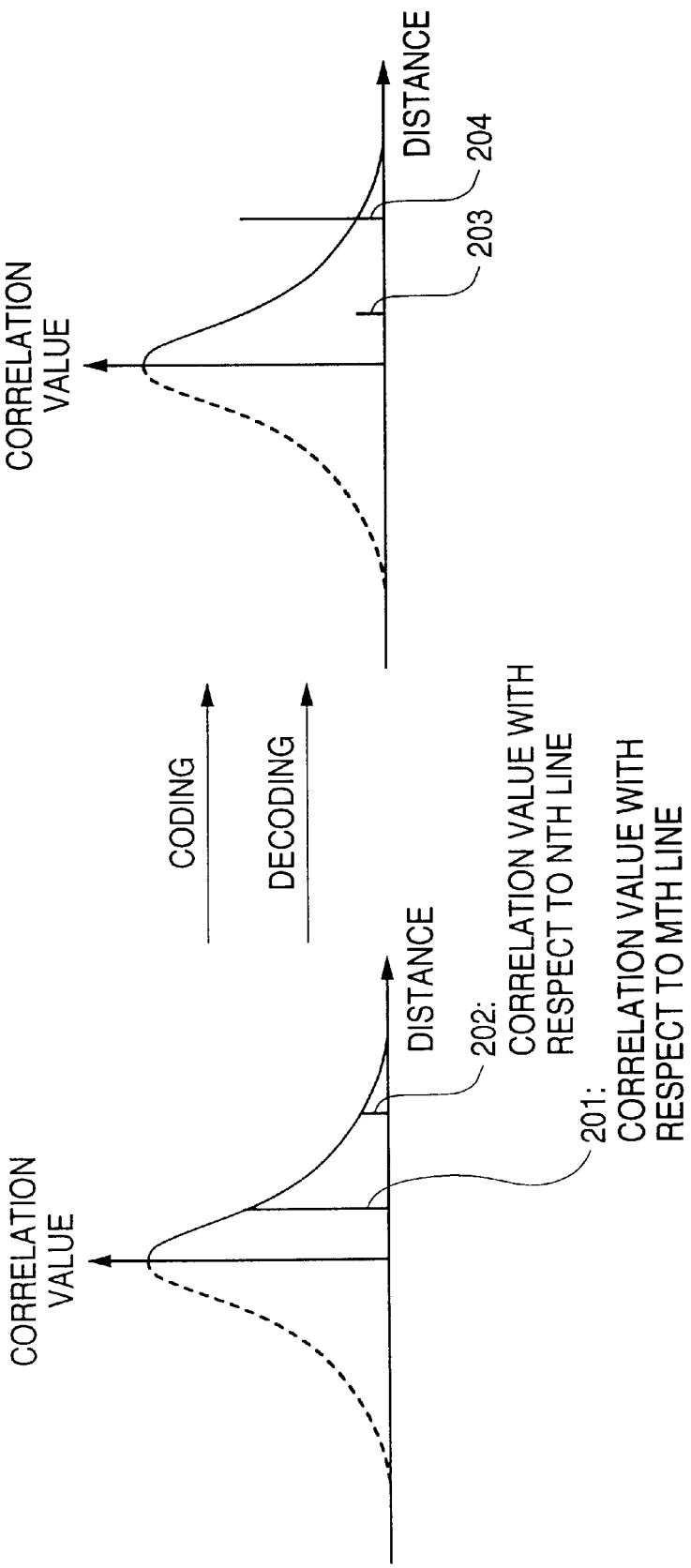

UTILIZATION OF CONTINUITY

UTILIZATION OF SIMILARITY

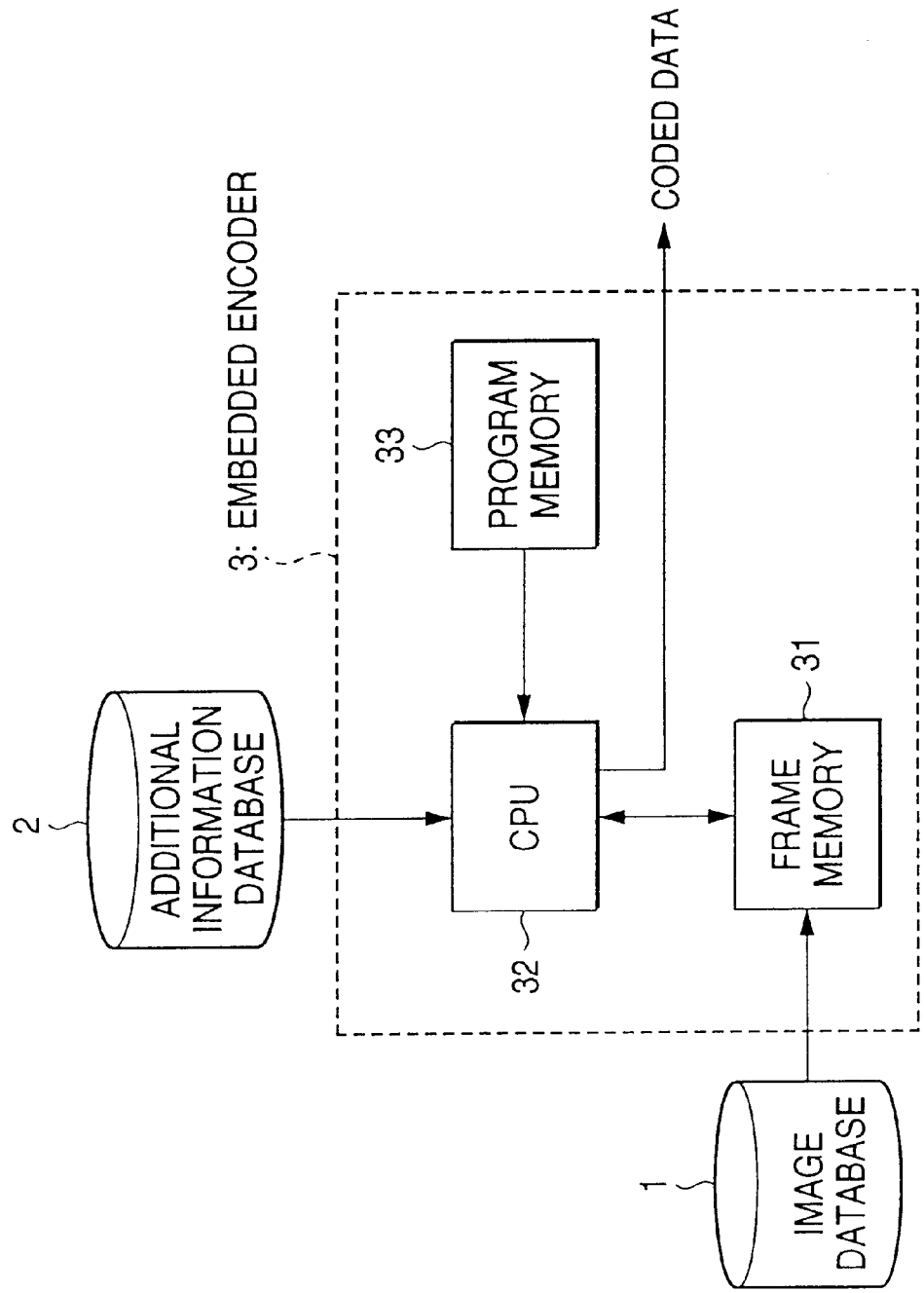

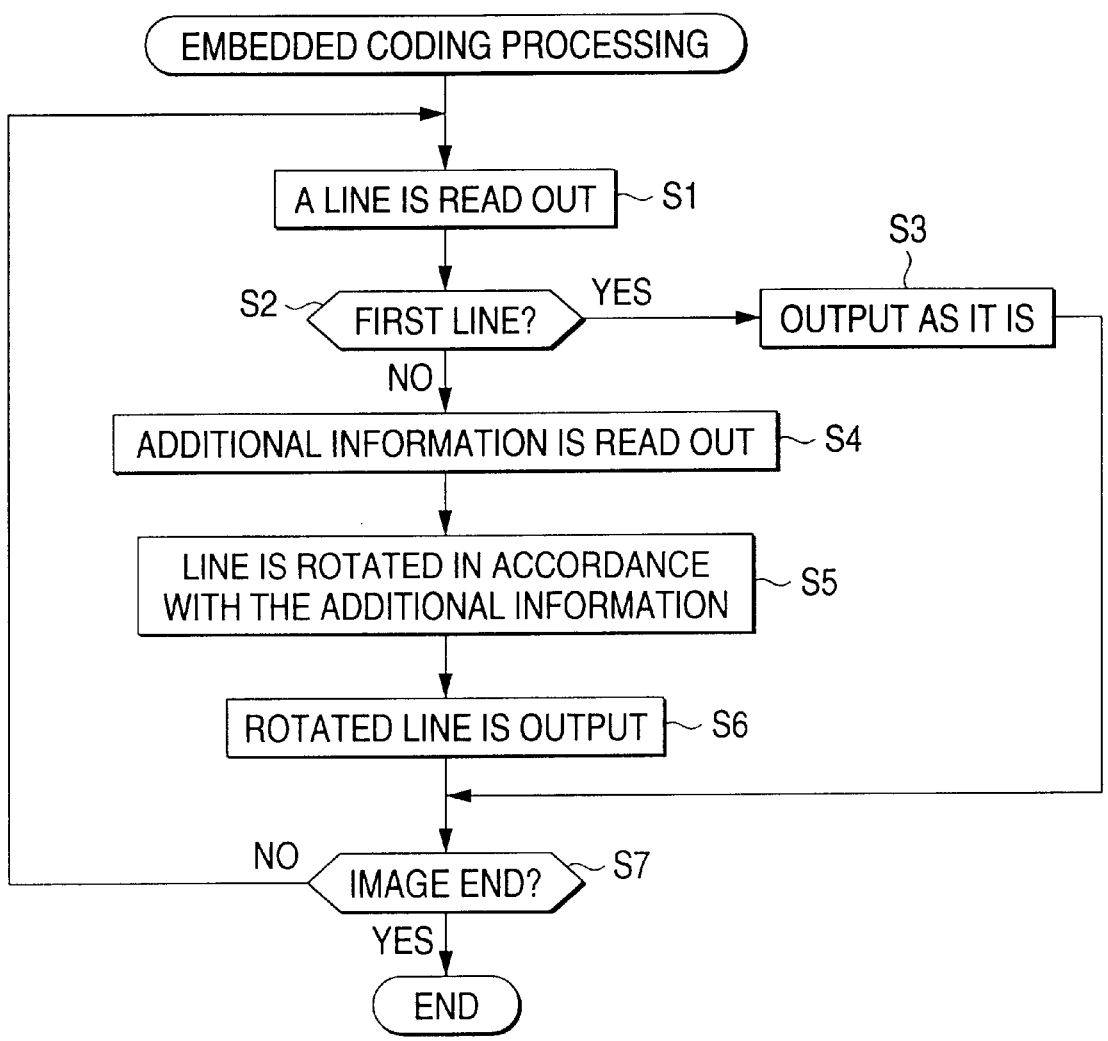

NTH LINE

SLIDE

INSERTION

ROTATION

ROTATION

CODING APPARATUS AND METHOD, DECODING APPARATUS AND METHOD, DATA PROCESSING SYSTEM, STORAGE MEDIUM, AND SIGNAL

BACKGROUND

1. Field of the Invention

The present invention relates to a coding apparatus and method, a decoding apparatus and method, a data processing system, a storage medium, and a signal. In particular, the invention relates to a coding apparatus and method, a decoding apparatus and method, a data processing system, a storage medium, and a signal which allow information to be embedded into data without deterioration in decoded data and without increase in data amount.

2. Background of the Invention

An example of a technique of embedding information without increasing the data amount is such that the LSB or the lowest two bits of digital audio data are converted to information to be embedded. In this technique, the fact that the lowest bit or bits of digital audio data do not much influence its sound quality is utilized and the lowest bit or bits of digital audio data are simply replaced by information to be embedded. Therefore, at the time of reproduction, information-embedded digital audio data is output as it is, that is, without returning the lowest bit or bits to the original state. That is, the digital audio data is output in a state that information is embedded therein because it is difficult to return the lowest bit or bits embedded information to the original state and the lowest bit or bits do not much influence the sound quality.

However, in the above technique, a signal that is different from the original signal is output. Therefore, influence occurs in the sound quality when the signal is audio data or in the image quality when the signal is video data.

SUMMARY OF THE INVENTION

An object of the present invention is to solve the foregoing problem.

In order to achieve the foregoing object, the present invention provides a coding apparatus for coding first data in accordance with second data, the coding apparatus comprising a memory for storing at last partial data of the first data, and a coding section for embedding data in relation to the second data into the first data by rotating the at least partial data stored in the memory in accordance with the second data.

In order to achieve the foregoing object, the present invention provides a decoding apparatus for decoding coded data in which first data has been coded in accordance with second data, the decoding apparatus comprising a rotation section for rotating at last partial data of the coded data; a correlation calculating section for calculating a correlation between the at least partial data rotated by the rotation section and peripheral data of the at least partial data; a second data decoding section for decoding the second data embedded in the coded data by determining a rotation amount of the at least partial data of the coded data rotated by the rotation section on the basis of the correlation obtained by the correlation calculating section; and first data decoding section for decoding the coded data to the original first data in accordance with the rotation amount determined by the second data decoding section.

BRIEF DESCRIPTION OF THE DRAWINGS

FIG. 3A is a conceptual view showing an image before it is coded by using correlation or a decoded result in an embodiment of the present invention.

FIG. 3B is a conceptual view showing a result in which the image has been coded by using the correlation in the embodiment of the present invention.

FIG. 6 is a block diagram showing a structural example of hardware of an embedded encoder 3 of FIG. 1.

FIG. 8 is a flowchart for explaining the operation of the embedded encoder 3 of FIG. 7.

DESCRIPTION OF THE PREFERRED EMBODIMENT

A coding apparatus and method, a decoding apparatus and method, a digital processing system, a storage medium, and a signal according to the present invention will be hereinafter described with reference to the accompanying drawings.

Figure 1:
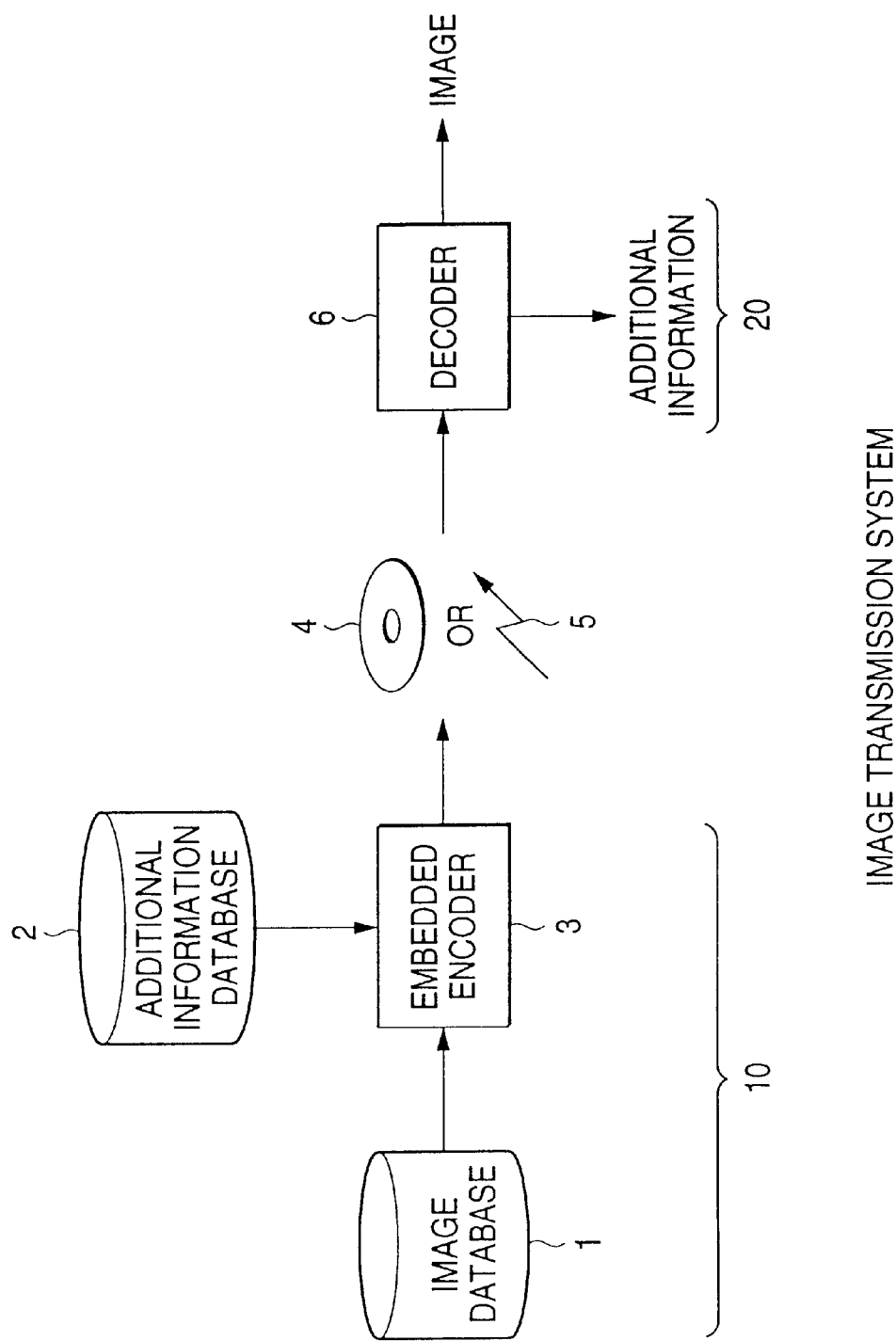
FIG. 1 is a block diagram showing an embodiment of an image transmission system to which the present invention is applied.

FIG. 1 shows an example configuration of an embodiment of an image transmission system to which the invention is applied. The term "system" means a logical collection of a plurality of devices and whether the constituent devices are contained in the same body is irrelevant to the definition of this term.

This image transmission system consists of a coding apparatus 10 and a decoding apparatus 20. The coding apparatus 10 codes an object of coding such as an image and outputs coded data. The decoding apparatus 20 decodes coded data into the original image.

An image database 1 stores images to be coded, for example, digital images. A stored image is read out from the image database 1 and supplied to an embedded encoder 3.

An additional information database 2 stores additional information, such as digital data, as information to be embedded into an image as a coding object. Stored additional information is read out from the additional information database 2 and supplied to the embedded encoder 3, too.

The embedded encoder 3 receives an image from the image database 1 and additional information from the additional information database 2. The embedded encoder 3 codes the image that is supplied from the image database 1 in accordance with the additional information that is supplied from the additional information database 2 in such a manner that decoding will be performed by utilizing an energy deviation of the image, and outputs a resulting image. That is, the embedded encoder 3 codes the image by embedding the additional information into the image in such a manner that decoding will be performed by utilizing an energy deviation of the image, and outputs coded data. The coded data that is output from the embedded encoder 3 is recorded on a recording medium 4 such as a semiconductor memory, a magneto-optical disc, a magnetic disk, an optical disc, a magnetic tape, or a phase change disc. Alternatively, the coded data is transmitted, as a signal, over a transmission medium 5 such as ground waves, a satellite channel, a CATV (cable television) network, the Internet, or public lines, and supplied to the decoding apparatus 20.

The decoding apparatus 20 is a decoder 6, which receives coded data that is supplied via the recording medium 4 or the transmission medium 5. The decoder 6 decodes the coded data into the original image and the additional information by utilizing an energy deviation of the image. The decoded image is supplied to a monitor (not shown), for example, and displayed thereon. The decoded additional information is text data, audio data, a reduced image, or the like that relates to the image.

Next, the principles of the embedded coding in the embedded encoder 3 shown in FIG. 1 and the decoding in the decoder 6 also shown in FIG. 1 will be described.

In general, what is called information has a deviation of energy or entropy and the deviation is recognized as valuable information. For example, the reason why an image that is obtained by photographing a certain scene is recognized by a human as an image of the scene is that the image, for example, pixel values of the respective pixels constituting the image, has an energy deviation corresponding to the scene. An image having no energy deviation is just noise or the like and is useless information.

Therefore, even if the original energy deviation of valuable information is, say, broken, by performing a certain manipulation on the information, the valuable information can be restored by restoring the original energy deviation from the broken one. That is, coded data obtained by coding information can be decoded into the original information by utilizing the original energy deviation of the information.

For example, the deviation of the energy of information is represented by correlation, continuity, similarity, etc.

The correlation of information means correlation between constituent elements (in the case of an image, pixels, lines, or the like that constitute the image), for example, autocorrelation, or distance between a certain constituent element and another one of the information. An example of correlation is correlation between two lines of an image that is a correlation value represented by the sum of the squares of the differences between corresponding pixel values.

Figure 2:
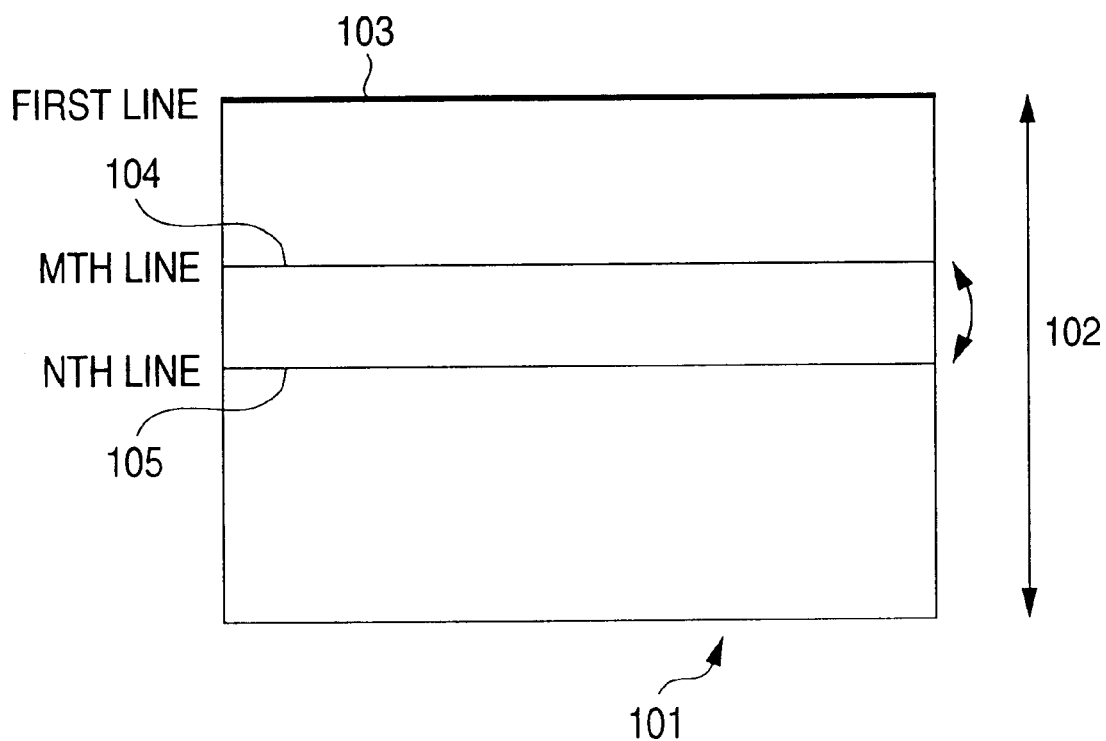
FIG. 2 is a view showing an image of an object to be coded in the present invention.

For example, now assume an image 101 formed by H lines 102 as shown in FIG. 2. In general, as shown in FIG. 3A, the correlation value between the first-row line (first line) 103 from the top of the image and each of the other lines is larger when the line is closer to the first line 103 (i.e., located higher in the image of FIG. 2) as indicated by a correlation value 201 with the Mth line, and is smaller when the line is more distant from the first line 103 (i.e., located lower in the image of FIG. 2) as indicated by a correlation value 202 with the Nth line. That is, there is a deviation of correlation values that the correlation value with the first line 103 is larger for a line closer to the first line 103 and smaller for a line more distant from the first line 103.

In the image 101 of FIG. 2, a manipulation is performed that interchanges the pixel values of the Mth line 104 that is relatively close to the first line 103 with those of the Nth line 105 that is relatively distant from the first line 103. Correlation values between the first line 103 and the other lines in the line-interchanged image 101 are as shown in FIG. 3B, for example.

In the line-interchanged image 101, the correlation value with the Mth line 104 that is close to the first line 103 becomes small as indicated by a correlation value 203 with the Mth line and the correlation value with the Nth line 105 that is distant from the first line 103 becomes large as indicated by a correlation value 204 with the Nth line.

Therefore, in FIG. 3B, the deviation of correlation that the correlation value is larger for a line closer to the first line 103 and smaller for a line more distant from the first line 103 is broken. However, the broken deviation of correlation of the image can be repaired to the original state by utilizing the deviation of correlation that the correlation value is larger for a line closer to the first line 103 and smaller for a line more distant from the first line 103. In FIG. 3B, the facts that the correlation value with the Mth line 104 that is close to the first line 103 is small and the correlation value with the Nth line 105 that is distant from the first line 103 is large are clearly unnatural, and hence the original deviation of correlation is restored by interchanging the Mth line 104 and the Nth line 105 with each other. An image having the deviation of correlation shown in FIG. 3A, that is, the original image 101, is restored by interchanging the Mth line 104 and the Nth line 105 in FIG. 3B with each other.

In the case described above with reference to FIGS. 2, and 3A and 3B, the image is coded by line interchanging. In the coding, for example, the embedded encoder 3 determines based on additional information which lines should be moved or which lines should be interchanged with each other. On the other hand, the decoder 6 restores the original image from a coded image, that is, a line-interchanged image, by moving the interchanged lines to their original positions by utilizing the correlation of the coded image. Further, in the decoding, at the same time, the decoder 6 restores additional information embedded in the image by detecting, for example, which lines were moved or which lines were interchanged with each other.

Figure 4A:
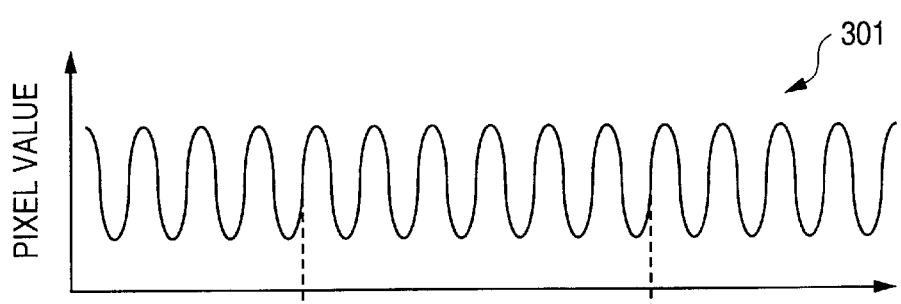
FIG. 4A is a conceptual view showing an image before it is coded by using continuity or a decoded result in an embodiment of the present invention.

As for the continuity of information, assume that for a certain line of an image, a waveform 301 as shown in FIG. 4A is observed in which the variation pattern of pixel values is continuous. In another line that is distant from the above line, a variation pattern of pixel values is observed that is different in continuity from the variation pattern of the above line; a deviation of continuity also exists. That is, when attention is paid to a certain pixel value variation pattern, a deviation of continuity is found that a similar pixel value variation pattern exists in an adjacent portion and the pixel value variation pattern becomes more different as the position goes away.

Figure 4B:
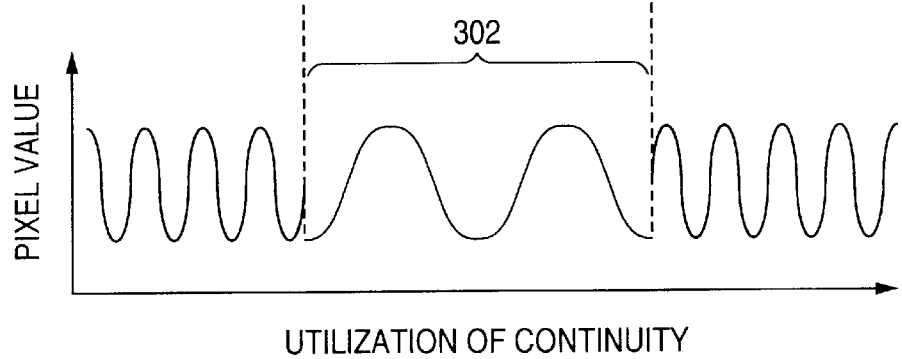
FIG. 4B is a conceptual view showing a result in which the image has been coded by using the continuity in the embodiment of the present invention.

For example, part of the waveform 301 shown in FIG. 4A in which the variation pattern of pixel values is continuous is replaced by a waveform 301 that is distant from the waveform 301 and has a different variation pattern of pixel values as shown in FIG. 4B.

In the case of FIG. 4B, the above-described deviation of continuity is broken. However, the broken deviation of continuity can be repaired by utilizing the deviation of continuity that portions adjacent to each other have continuous pixel value variation patterns and pixel value variation patterns become more different when they are more distant from each other. Specifically, in FIG. 4B, the pixel value variation pattern 302 of the part of the waveform is clearly different from the pixel value variation patterns of the other parts, and hence the deviation of continuity of the original image can be restored by replacing the pixel value variation pattern 302 with a waveform having a pixel value variation pattern similar to the pixel value variation patterns of the other parts. The waveform shown in FIG. 4A, that is, the original waveform, can be restored from the waveform shown in FIG. 4B by performing such replacement.

In the case described above with reference to FIGS. 4A and 4B, the image coding is to replace part of the waveform with a pixel value variation pattern that is much different from adjacent pixel value variation patterns. In the coding, for example, the embedded encoder 3 determines based on additional information what part of the waveform should be changed greatly in pixel value variation pattern and how greatly the pixel value variation pattern should be changed. The decoder 6 restores the original waveform from a coded signal, that is, a waveform having a part with a much different pixel value variation pattern by utilizing the deviation of continuity that adjacent pixel value variation patterns are continuous and pixel value variation patterns become more different when they are more distant from each other. Further, in the decoding, at the same time, the decoder 6 restores embedded additional information by detecting, for example, what part of the waveform was changed greatly in pixel value variation pattern and how greatly the pixel value variation pattern was changed.

As for the similarity of information, it is known that part of an image obtained by photographing a scene, for example, is generated by utilizing fractal, that is, autosimilarity, of the image. For example, a photographed image of a sea 401 and a forest 402 shown in FIG. 5A has a deviation of similarity that the similarity between the pixel value variation pattern of a portion of the sea 401 and that of another portion of the sea 401 is high but the similarity between the pixel value variation pattern of the same portion and that of a portion in the forest 402 that is distant from the sea 401 is low. The same thing is true of the similarity of a shape itself such as an edge shape pattern of an image portion rather than a pixel value variation pattern.

Figure 5A:
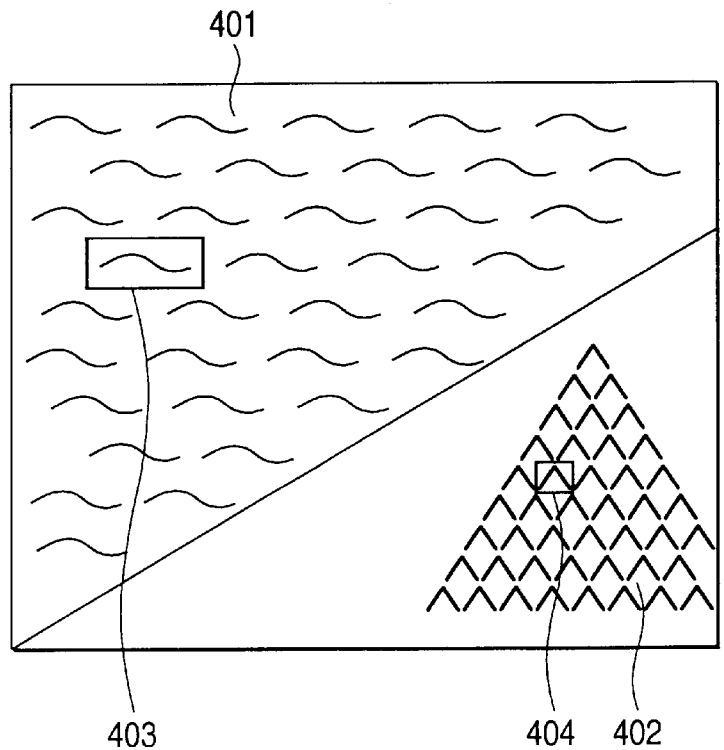
FIG. 5A is a conceptual view showing an image before it is coded by using similarity or a decoded result in an embodiment of the present invention.
Figure 5B:
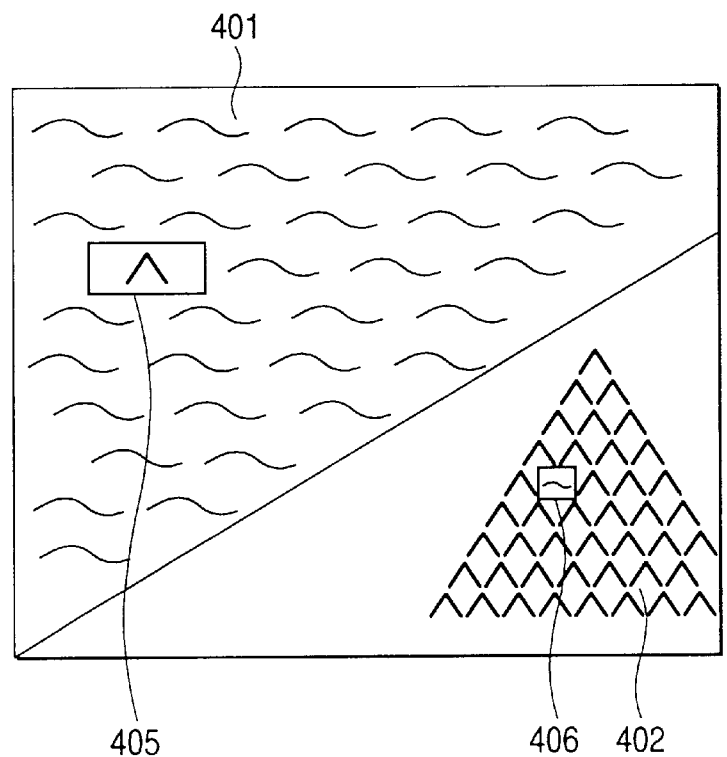
FIG. 5B is a conceptual view showing a result in which the image has been coded by using the similarity in the embodiment of the present invention.

For example, a part 403 of the sea 401 shown in FIG. 5A is replaced by a part 404 of the forest 402 as shown in FIG. 5B.

In FIG. 5B, the above-described deviation of similarity is broken. However, the broken deviation of similarity can be repaired by utilizing the deviation of similarity that adjacent pixel value variation patterns are high in similarity and the similarity becomes lower when pixel value variation patterns are more distant from each other. Specifically, in FIG. 5B in which part of image of the sea 401 is made a part 405 of the image of the forest 402, the similarity between a portion in the sea 401 and the replaced part 405 of the image of the forest 402 is clearly lower than the similarity between portions within the image of the sea 401. The deviation of similarity of the original image is restored by replacing the part 405 that is made the image of the forest 402 with an image having characteristics that are similar to those of an image of the sea 401 around that part 405, that is, a part 406 of the image of the sea 401. The image shown in FIG. 5A, that is, the original image, is restored from the image shown in FIG. 5B by performing such replacement.

In the case described above with reference to FIGS. 5A and 5B, the image coding is to replace the part 403 of the image of the sea 402 with the part 404 of the image of the forest 402. In the coding, for example, the embedded encoder 3 determines based on additional information what part (e.g., a position on the picture) of the image of the sea 401 should be replaced by the part 404 of the image of the forest 402. The decoder 6 restores the original image shown in FIG. 5A from a coded signal, that is, the image of the sea 401 having the part 405 of the image of the forest 402 by utilizing the deviation of similarity of the coded signal that adjacent pixel value variation patterns are high in similarity and the similarity becomes lower when pixel value variation patterns are more distant from each other. Further, in the decoding, at the same time, the decoder 6 restores embedded additional information by, for example, detecting what part of the image of the sea 401 was replaced by part of the image of the forest 402.

As described above, the embedded encoder 3 codes a coding object image in accordance with additional information so that decoding will be performed by utilizing an energy deviation of the image. The decoder 6 decodes coded data into the original image and the additional information without any overhead for decoding by utilizing an energy deviation of the image.

Since additional information is embedded into a coding object image, a resulting coded image is rendered different from the original state and unrecognizable as valuable information. That is, encryption of the coding object image without any overhead is realized.

Further, completely reversible digital watermarking is realized. For example, in the conventional digital watermarking, the lowest bits of pixel values that do not much influence the image quality are simply changed to values corresponding to a digital watermark. However, it is difficult to return the lowest bits to the original values. Therefore, changing the lowest bits as digital watermarking causes deterioration in the image quality of a decoded image. In the embedded coding of the invention, in the case where coded data is decoded by utilizing an energy deviation of the original image, the original image having no deterioration and additional information are obtained. Therefore, the image quality of a decoded image is not deteriorated even if the additional information is used as digital watermarking information.

Since embedded additional information is taken out by decoding coded data into an image, side information is provided without any overhead. In other words, since additional information is embedded into an image without any overhead that is usually necessary to take out the additional information, coded data that is obtained as a result of the embedding is compressed by an amount corresponding to the additional information. For example, if a half of an image is made a coding object and the other half is made additional information and if the latter half of the image is embedded into the half image as the coding object, the image is simply compressed into ½ of the original image.

Since coded data is decoded by utilizing an energy deviation of the original image which is, so to speak, a statistical quantity, the error resistance is high. That is, robust coding which is coding high in robustness is realized.

Since coded data is decoded by utilizing an energy deviation of the original image, there is a possibility that more additional information is embedded when the energy deviation is more characteristic, that is, when, in the case of an image, the activity of the image is higher or its redundancy is lower. As described above, coded data obtained as a result of embedding of additional information is compressed by an amount corresponding to the additional information. That is, the compression ratio is larger when the activity of the image is higher or the redundancy of the image is lower. For example, in the MPEG (Moving Picture Experts Group) scheme which is a conventional coding scheme, basically the compression ratio is smaller when the activity of an image is higher or the redundancy of an image is lower. The embedded coding scheme of the invention is much different from the conventional coding schemes in this respect.

An image can be provided with a voice used as a key by making an image a coding object and employing, as additional information, information of a different medium than an image, for example, a voice. Specifically, on the coding apparatus 10 side, a voice spoken by the subscriber, such as "Open sesame," is embedded as additional information into an image. On the decoding apparatus 20 side, a user is caused to speak a voice "Open sesame" and speaker recognition is performed by comparing the voice of the user with the voice embedded in the image. This speaker recognition allows automatic presentation of the image only when the user is recognized as the subscriber. A voice waveform itself, as well as what is called a feature parameter of a voice, can be used as a voice as additional information.

A voice can be provided with an image used as a key (e.g., voice response after face recognition) by making a voice a coding object and employing, as additional information, information of a media different than a voice, for example, an image. Specifically, on the coding apparatus 10 side, an image of the face of a user is embedded into, for example, a voice as a response to the user. On the decoding apparatus 20 side, the face of a user is photographed and a voice in which a face image that matches the photographed image is embedded is output. In this manner, a voice response system that makes voice responses that are different for respective users is realized.

It is also possible to embed information of a certain medium into another information of the same medium such as embedding one voice into another voice or embedding one image into another image. Further, by embedding a voice and a face image of the subscriber, what is called a double key system can be realized in which an image can be presented only when a voice and a face image of a user coincide with those embedded in the image.

For example, it is also possible that one of an image and a voice that constitute a television broadcast signal and are, so to speak, synchronized with each other is embedded-into the other. In this case, what is called a true integrated signal can be realized in which pieces of information of different media are integrated with each other.

In the embedded coding scheme of the invention, as described above, more additional information may be embedded into information when the energy deviation of the information is more characteristic. Therefore, the overall data amount is controlled by, for example, adaptively selecting one of two pieces of information having a more characteristic energy deviation and embedding the other into the selected piece of information. That is, it becomes possible to cause one of two pieces of information to absorb the information quantity of the other. Controlling the overall data amount enables information transmission using a data amount that conforms to the transmission bandwidth and the use status of a transmission line and other factors of the transmission environment (i.e., environment-adaptive network transmission).

For example, coding in which higher-layer information having a smaller information quantity than lower-layer information is generated (what is called layered coding) is realized without increasing the data amount by embedding a reduced image into the original image or by embedding a decimated voice into the original voice.

For example, by embedding an image to serve as a key for retrieving each original image into each original image, a database is realized in which an image is retrieved based on a key image.

FIG. 6 shows an example hardware configuration of the embedded encoder 3 shown in FIG. 1 which performs embedded coding in which additional information is embedded into an image so that the original image can be restored by utilizing the correlation of the image.

An image that is supplied from the image database 1 is supplied to a frame memory 31. The frame memory 31 temporarily stores, for example, on a frame-by-frame basis, the image supplied from the image database 1.

A CPU (Central Processing Unit) 32 executes a program stored in a program memory 33, and makes such control that an embedding coding processing described later is carried out. That is, the CPU 32 receives additional information supplied from an additional information data base 2, and controls the whole embedding encoder so that the additional information is embedded in accordance with the program into the image stored in the frame memory 31. Specifically, the CPU 32 shifts, for example, one line in a horizontal direction, that is, a series of pixels arranged in the horizontal direction, which constitutes the image stored in the frame memory 31, toward the horizontal direction on the basis of the additional information, so that it makes such control that the additional information is embedded in each line. The image embedded with the additional information is controlled by the CPU 32 so that it is output as coded data.

The program memory 33 is constituted by, for example, a ROM (Read-only memory) or a RAM (Random access memory). A computer program and necessary data for causing the CPU 32 to carry out the embedding coding processing are stored in the program memory 33.

The frame memory 31 is constituted by a plurality of banks so that a plurality of frames are stored. In the frame memory 31, storing of an image supplied from the image database 1, storing of an image as an object of an embedding coding processing by the CPU 32, and outputting of an image after the embedding coding processing, that is, outputting of the coded data are carried out at the same time by changing the banks. Even if images supplied from the image database 1 are moving pictures, the coded data is output in real time.

Figure 7:
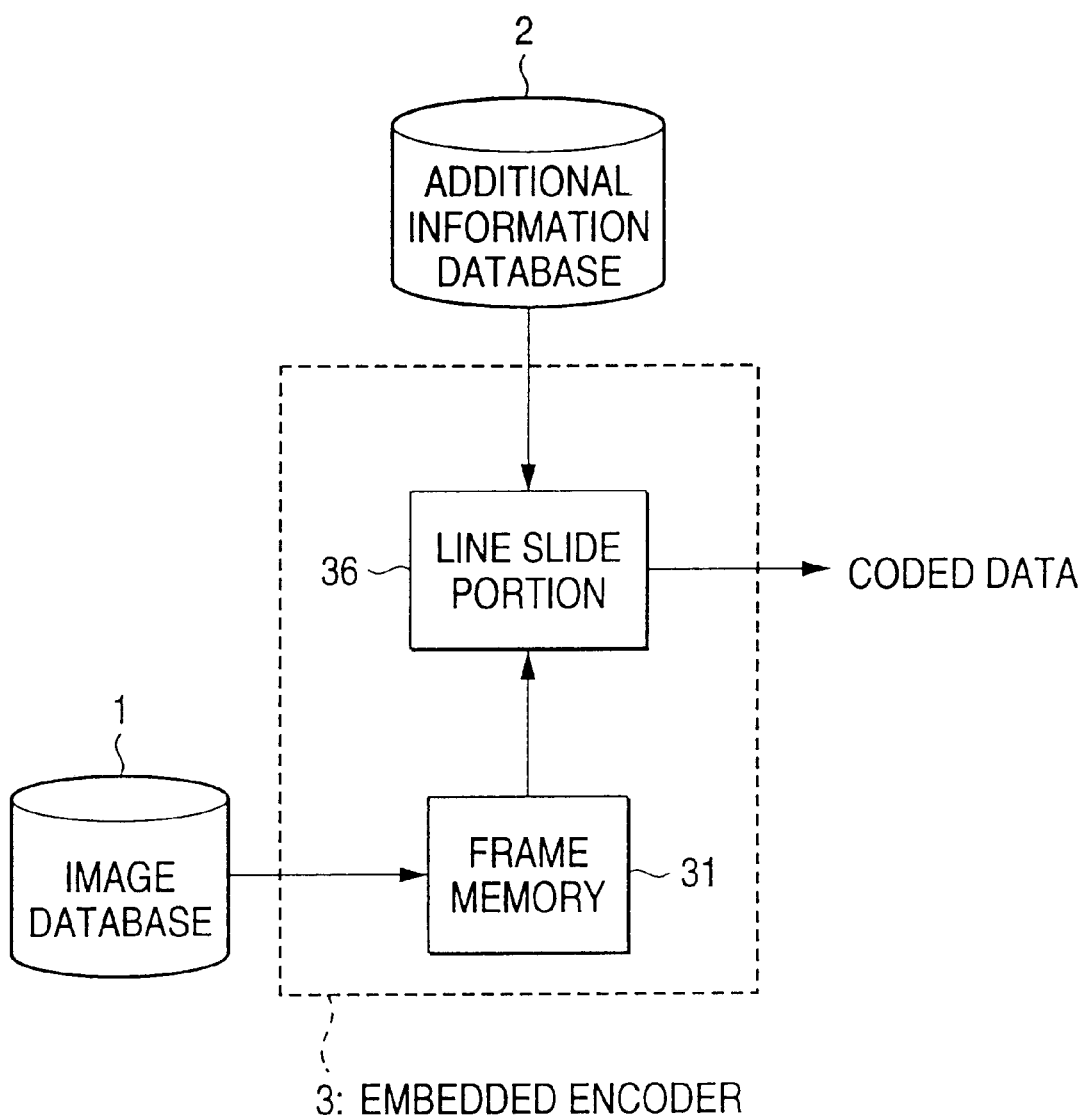
FIG. 7 is a block diagram showing a functional structural example of the embedded encoder 3 of FIG. 6.

FIG. 7 shows a functional structural example of the embedded encoder 3 of FIG. 6. The computer program stored in the program memory 33 is executed by the CPU 32, so that the functional structure shown in FIG. 7 is realized.

As explained in FIG. 6, the frame memory 31 temporarily stores images supplied from the image database 1. A line slide section 36 reads out additional information from the additional information database 2, and shifts a predetermined line constituting an image stored in the frame memory 31 toward a horizontal direction by a shift amount corresponding to the additional information, so that the additional information is embedded in the line and it is output as coded data.

With reference to a flowchart of FIG. 8, an embedding coding processing carried out in the embedded encoder 3 of FIG. 7 will be described.

Images stored in the image database 1 are read out, and are sequentially supplied and stored in the frame memory 31.

The line slide section 36 reads out, at step S1, a predetermined line constituting an image stored in the frame memory 31. The processing operation proceeds to step S2, and it is judged whether or not the read out line, that is, a marked line is a first line, that is, an uppermost line of the image of one frame. At step S2, in the case where the marked line is the first line, the processing operation proceeds to step S3, and the line slide section 36 outputs the first line directly as coded data, and the processing operation skips steps S4 to S6 and proceeds to step S7.

At step S2, in the case where it is judged that the marked line is not the first line, that is, in the case where the marked line is some line subsequent to a second line, the processing operation proceeds to step S4, and the line slide section 36 reads out additional information to be embedded in the marked line from the additional information database 2, and the processing operation proceeds to step S5. At step S5, in the line slide section 36, rotation of the marked line is performed toward the horizontal direction by the number of pixels corresponding to the additional information read out at step S4.

Figure 9A:
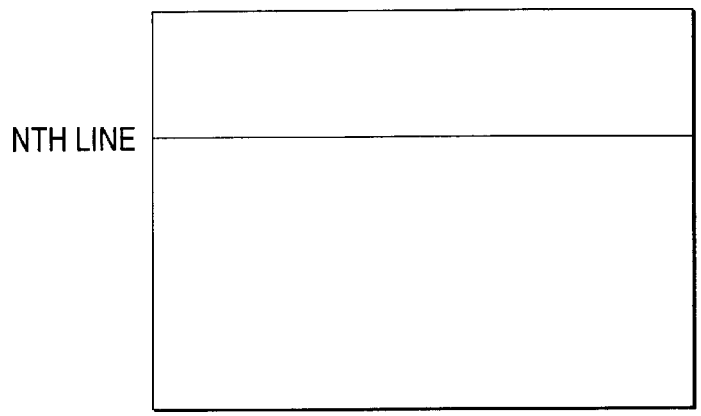
FIG. 9A is a view before rotation at step S5 of FIG. 8.
Figure 9B:
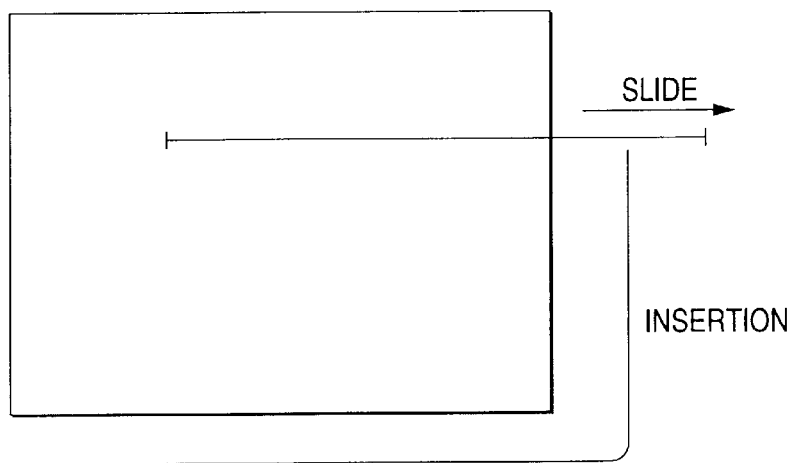
FIG. 9B is a view showing a first step of the rotation at step S5 of FIG. 8.
Figure 9C:
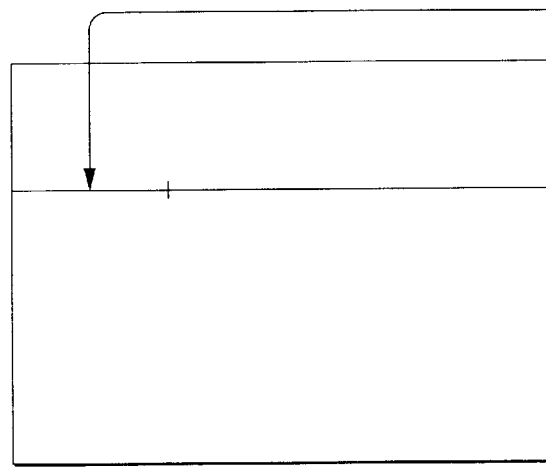
FIG. 9C is a view showing a second step of the rotation at step S5 of FIG. 8.

That is, for example, as shown in FIG. 9A, it is assumed that the Nth line (N≠1) is the marked line. As shown in FIG. 9B, the line slide section 36 slides the Nth line by the same number of pixels as the value of the additional information toward a left or right direction of the horizontal direction, for example, the right direction. The line slide section 36 inserts a portion of the Nth line projected by sliding toward the right of the frame into the left side of the Nth line as shown in FIG. 9C.

In the case where the additional information is image data, the rotation of the Nth line is not performed by the same number of pixels as the value of the additional information as described above, but the rotation of the Nth line may be performed according to its characteristic amount, that is, a histogram, DR, dispersion, etc.

After the line slide section 36 rotates the marked line, the processing operation proceeds to step S6, and the line slide section 36 outputs the marked line after the rotation as the coded data, and then, the processing operation proceeds to step S7.

At step S7, it is judged whether or not an image which has not been read out is stored in the frame memory 31, and in the case where it is judged that such an image is stored, the processing operation returns to step S1, and for example, a line below the marked line by one line or a first line of a new frame is read out as a new marked line, and the same processing is subsequently repeated.

At step S7, in the case where it is judged that an image which has not been read out is not stored in the frame memory 31, the embedding coding processing is ended.

Figure 10A:
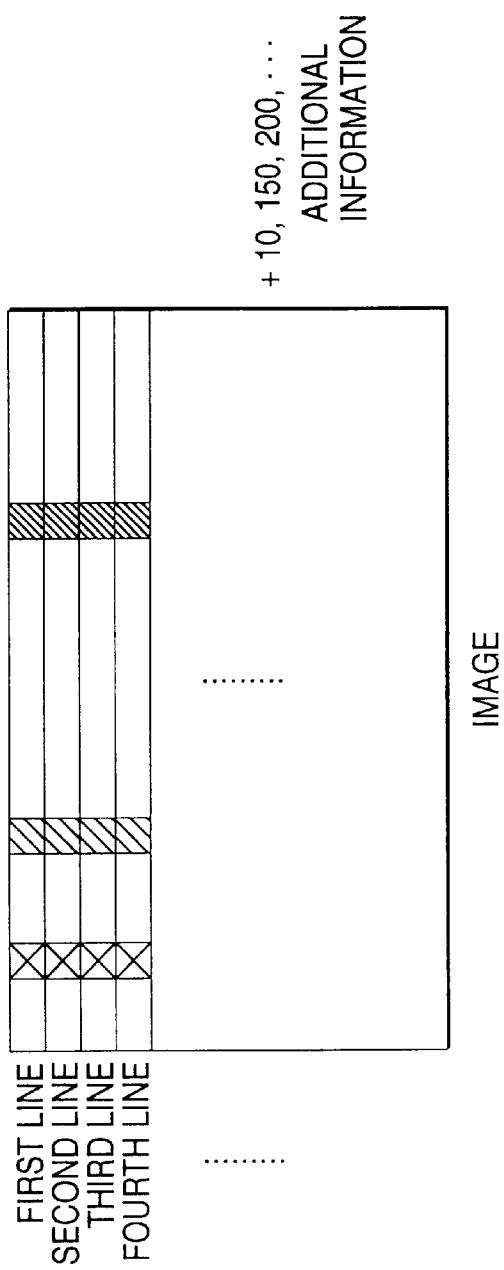
FIG. 10A is a view showing an image before the processing of the embedded encoder 3 is carried out.
Figure 10B:
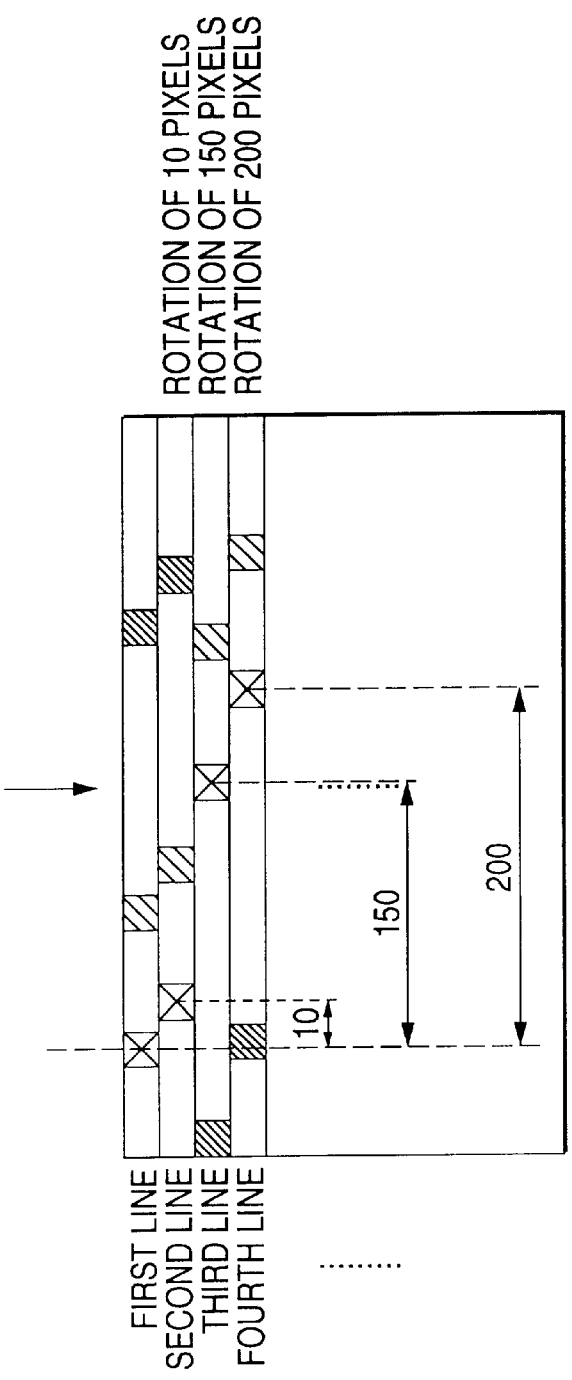
FIG. 10B is a view showing the image after the processing of the embedded encoder 3 has been carried out.

According to the embedding coding processing as described above, an image of some one frame is coded into coded data as follows:

That is, for example, in the case where 10, 150, 200, . . . are embedded as additional information into an image as shown in FIG. 10A, a first line is output as it is, as shown in FIG. 10B, and a second line is rotated toward the right direction by 10 pixels of the same value as the first additional information. Further, a third line is rotated toward the right direction by 150 pixels of the same value as the second additional information. A fourth line is rotated toward the right direction by 200 pixels of the same value as the third additional information. A fifth line and the following are similarly rotated toward the right direction by the number of pixels corresponding to the additional information.

As described above, in the case where the line slide section 36 rotates a line constituting an image stored in the frame memory 31 toward the right direction by the number of pixels corresponding to the additional information so that additional information is embedded in each line, the original image is decoded by performing the reverse rotation, and the reverse rotation becomes the additional information. Thus, the additional information is embedded in the image while picture quality of the image is not deteriorated and an amount of data is not increased.

That is, the rotated line as the line in which the additional information has been embedded is reversely rotated without an overhead to the correct position by using correlation of images, that is, here, correlation with respect to the line positioned at the correct position, and the additional information is decoded. Thus, deterioration in picture quality by embedding of the additional information does not occur in the obtained decoded image.

In the case where a line located at a correct position does not exist in the coded data, it is difficult that the image and additional information are decoded by using the correlation of images as described above. In the embedding coding processing of FIG. 8, the first line of each frame is directly output as coded data while additional information is not embedded, that is, rotation is not performed.

Figure 11:
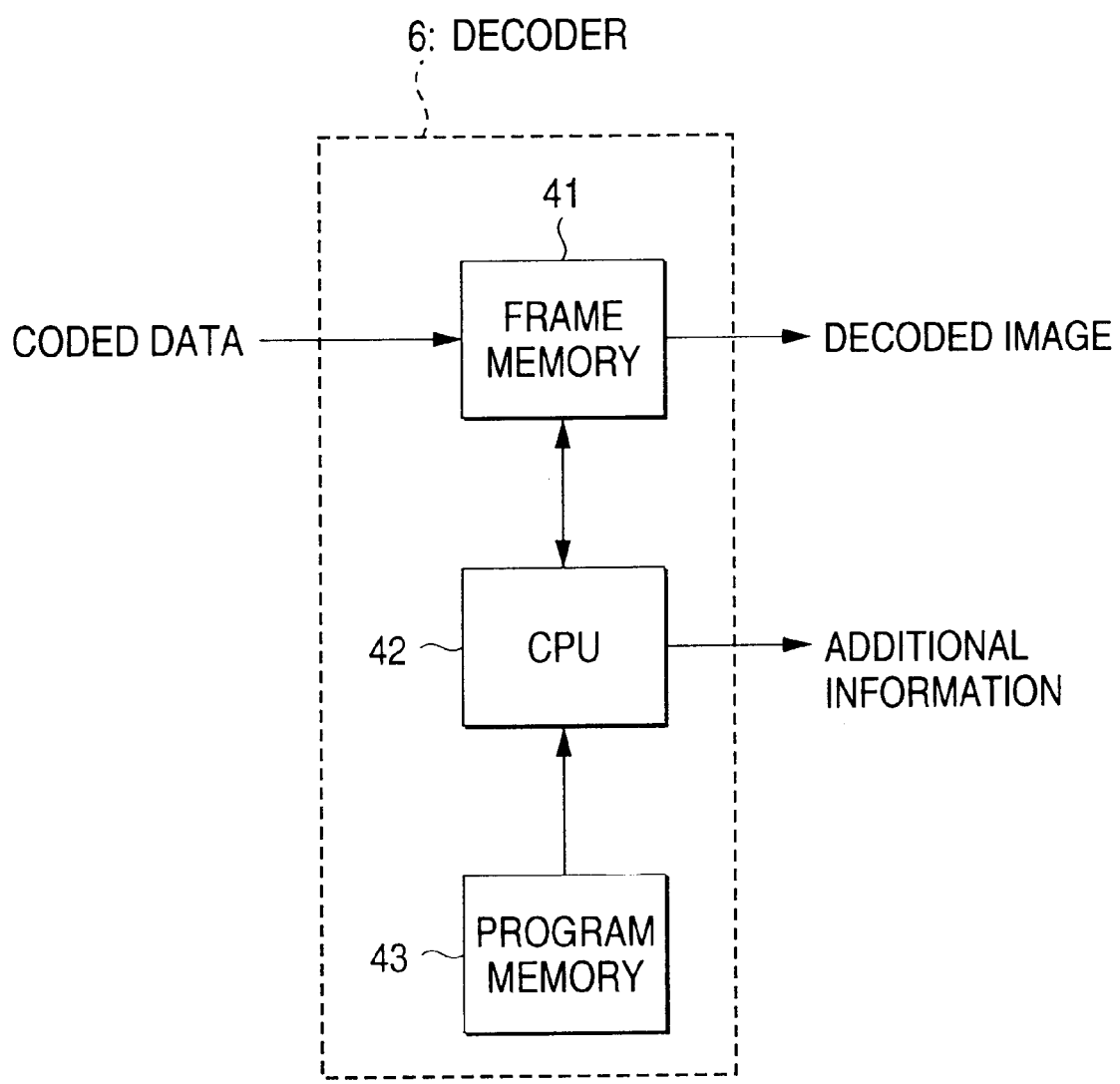
FIG. 11 is a block diagram showing a structural example of hardware of a decoder 6 of FIG. 1.

FIG. 11 shows a structural example of hardware of the decoder 6 of FIG. 1 for decoding the coded data output from the embedded encoder 3 of FIG. 7 into the original image and additional information by using the correlation of images.

Coded data, that is, an image in which additional information has been embedded or an embedded image is supplied to a frame memory 41. The frame memory 41 temporarily stores the embedded image in a unit of, for example, a frame. The frame memory 41 is also constituted similarly to the frame memory 31 of FIG. 6, and changing of banks is performed, so that even if the embedded images are moving pictures, a real-time processing is performed.

A CPU 42 executes a program stored in a program memory 43, so that a decoding processing described later is carried out. That is, the CPU 42 decodes the embedded image stored in the frame memory 41 into the original image and the additional information by using the correlation of images. Specifically, the CPU 42 calculates a correlation value of a line constituting the embedded image with respect to a line upper by one line while performing rotation of the line toward the horizontal direction for, for example, every pixel. The CPU 42 outputs, as a decoding result of the additional information, a rotation amount when the correlation value becomes maximum, and performs rotation by the rotation amount, so that the decoded image, that is, the original image is output.

The program memory 43 is constituted, for example, similarly to the program memory 33 of FIG. 6, and stores a computer program etc. for causing the CPU 42 to execute the decoding processing.

Figure 12:
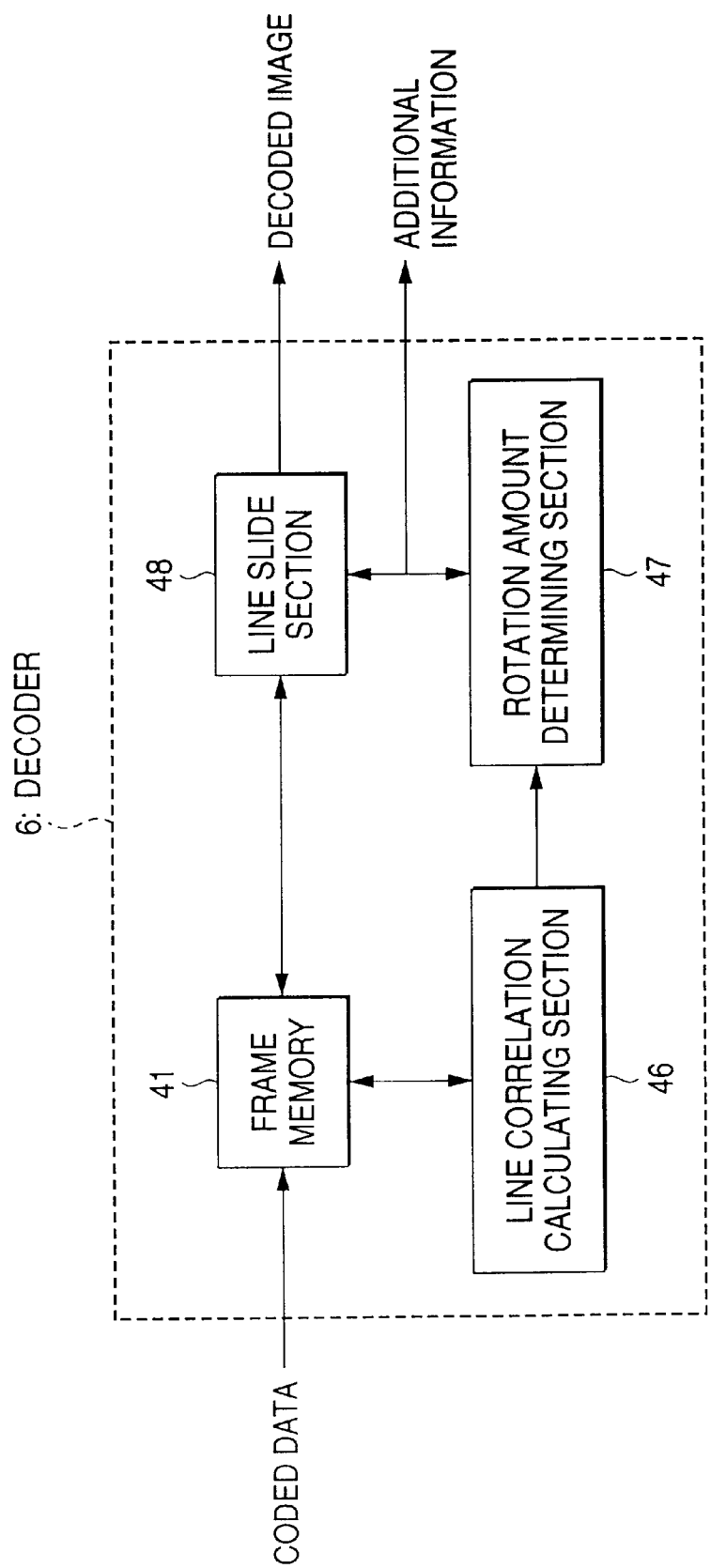
FIG. 12 is a block diagram showing a functional structural example of the decoder 6 of FIG. 11.

FIG. 12 shows a functional structural example of the decoder 6 of FIG. 11. The functional structure shown in FIG. 12 is realized through execution of the computer program stored in the program memory 43 by the CPU 42.

The frame memory 41 temporarily stores the embedded image as explained in FIG. 11.

Figure 13A:
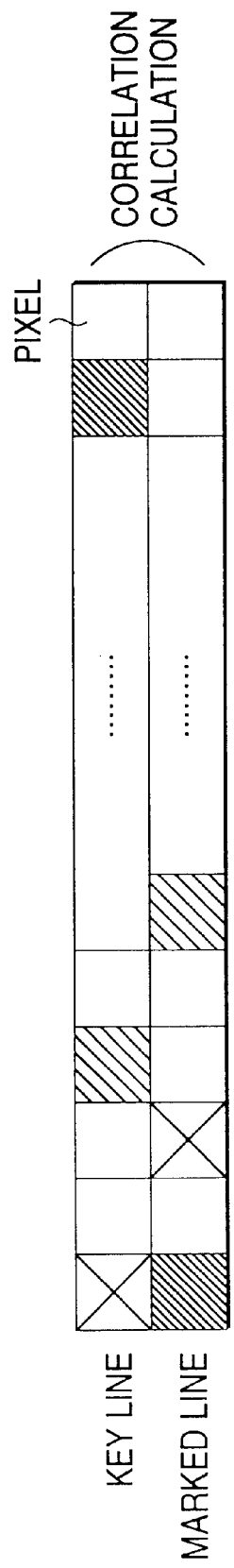
FIG. 13A is a view showing a coded image supplied to a line correlation calculating section 46 of FIG. 12.
Figure 13B:
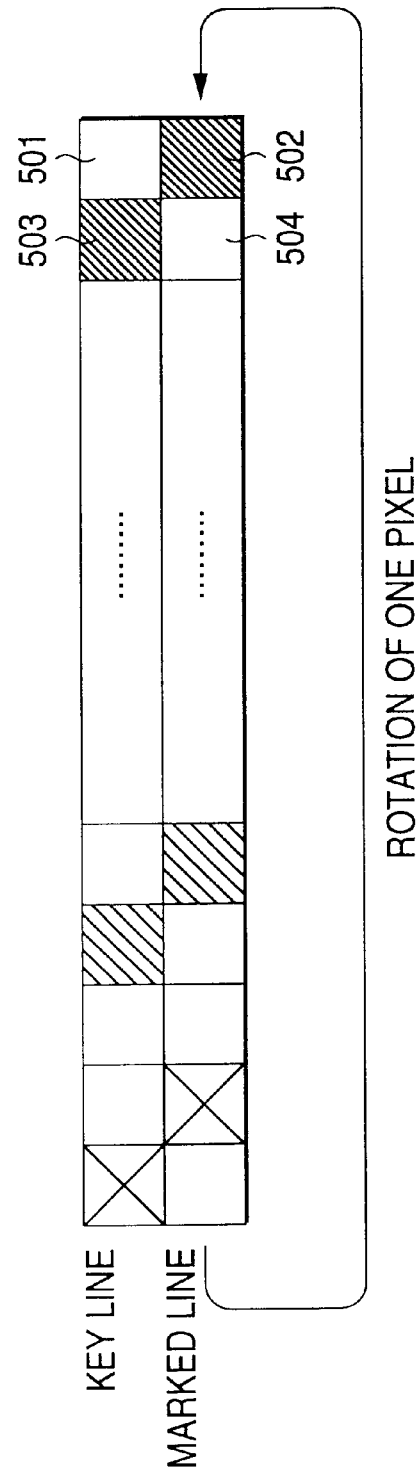
FIG. 13B is a view showing a state in which a rotation operation is performed in the line correlation calculating section 46 of FIG. 12.

A line correlation calculating section 46 reads out a predetermined line of the embedded image stored in the frame memory 41, and while the line is rotated by one pixel toward either one of the right and left directions, the line correlation calculating section 46 calculates a correlation value between the line after rotation and a line at a row upper the line by one. That is, as shown in FIG. 13A, the line correlation calculating section 46 reads out a line to be decoded in the embedded image stored in the frame memory 41, that is, a marked line and a line above the marked line by one, that is, a key line which becomes, so to speak, a key for decoding the marked line. The line correlation calculating section 46 calculates a correlation value between the marked line and the key line. As shown in FIG. 13B, the line correlation calculating section 46 rotates the marked line by one pixel toward either one of the left and right directions. In FIG. 13B the marked line is rotated toward the left direction opposite to the case explained in FIG. 9A, FIG. 9B and FIG. 9C. The line correlation calculating section 46 calculates the correlation value between the marked line after rotation toward the left direction and the key line. Subsequently, in the same manner, the line correlation calculating section 46 calculates the correlation value with respect to the key line while rotating the marked line until the marked line is returned to the original position, that is, the original position on the coded embedded image.

Here, although various methods are conceivable for calculation of the correlation value between lines, for example, the sum of the differences of pixel values for one line, such as corresponding pixels 501 and 502, 503 and 504, . . . between the key line and the marked line, or the sum of the squares of the differences is conceivable. At this time, as the correlation value becomes small, the correlation between the lines becomes large.

All the correlation values between the marked line and the key line at each rotation amount obtained by the line correlation calculating section 46 are supplied to a rotation amount determining section 47. The rotation amount determining section 47 detects a maximum value of correlation between the marked line and the key line on the basis of the correlation values supplied from the line correlation calculating section 46. The rotation amount determining section 47 determines a rotation amount of the marked line when the maximum value is obtained as a final rotation amount of the marked line, that is, as a determined rotation amount. The determined rotation amount is output as a decoded result of the additional information, and is supplied to a line slide section 48.

The line slide section 48 rotates the marked line stored in the frame memory 41 by the rotation amount supplied from the rotation amount determining section 47 toward the left direction similar to the case at the line correlation calculating section 46, and further, reads out the marked line after rotation, and outputs it as a decoded result of the marked line.

Figure 14:
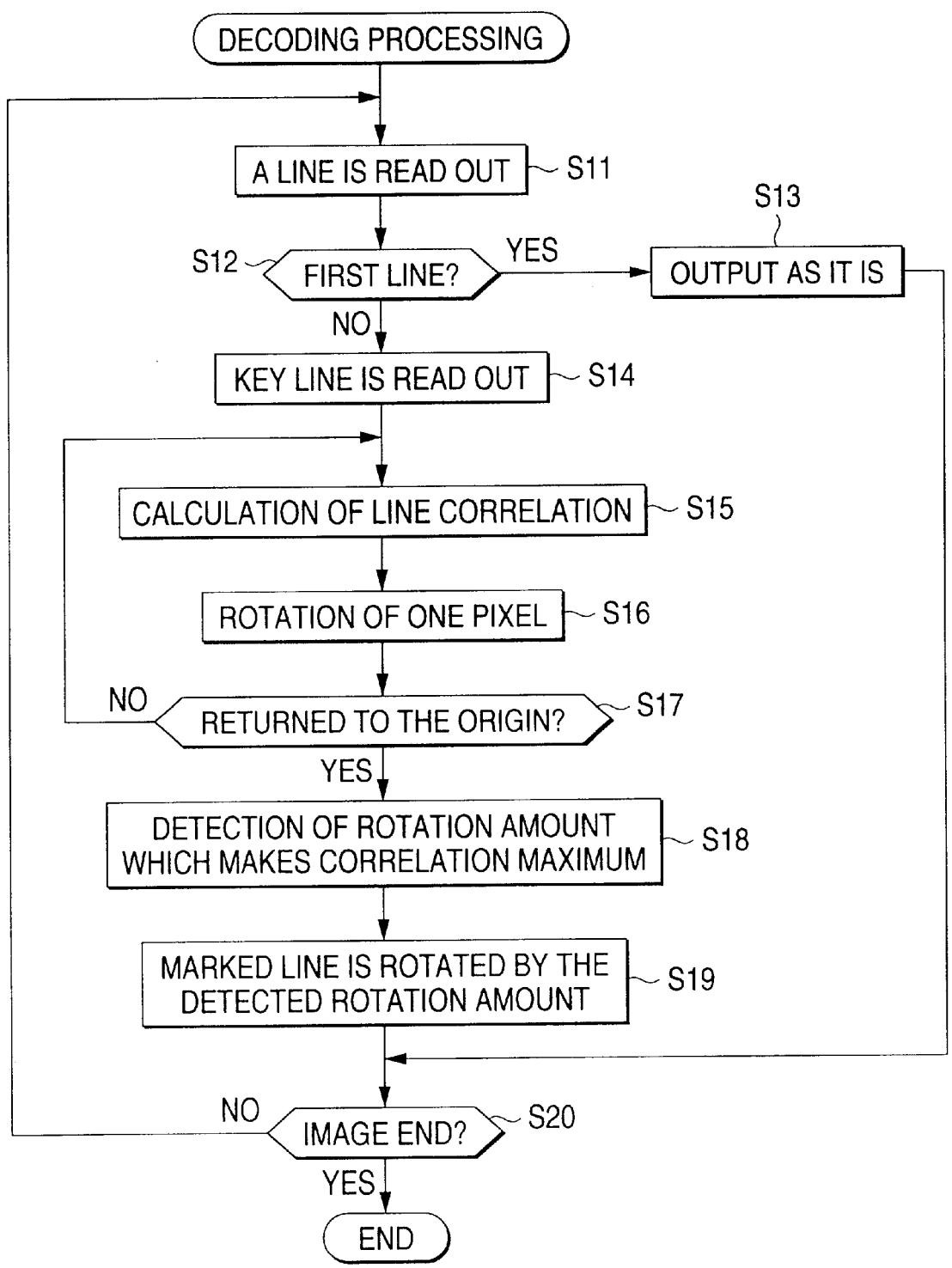
FIG. 14 is a flowchart for explaining an operation of the decoder 6 of FIG. 12.

With reference to a flowchart of FIG. 14, a decoding processing carried out in the decoder 6 of FIG. 12 will be described.

Supplied embedded images, that is, coded data is sequentially stored in the frame memory 41 in a unit of, for example, one frame.

In the line correlation calculating section 46, at step S11, a predetermined line of the embedded image stored in the frame memory 41 is read out as a marked line. Then the processing operation proceeds to step S12, and it is judged whether or not the marked line is a first line. At step S12, in the case where the marked line is the first line, the processing operation proceeds to step S13, and the line slide section 48 reads out the marked line as the first line from the frame memory 41, and outputs it as it is. The processing operation skips steps S14 to S19 and proceeds to step S20. That is, in this embodiment, from the above, the additional information is not embedded in the first line, that is, the first line is not rotated, so that the first line is output as it is.

At step S12, in the case where the marked line is not the first line, that is, in the case where the marked line is some line subsequent to a second line, the processing operation proceeds to step S14. At step S14, the line correlation calculating section 46 reads out, as a key line, a line above the marked line by one line from the frame memory 41, and the processing operation proceeds to step S15. At step S15, in the line correlation calculating section 46, a correlation value between the marked line and the key line, that is, a line correlation value is calculated, and is output to the rotation determining section 47.

In the line correlation calculating section 46, for example, the sum of or the sum of the squares of the differences between each pixel constituting the marked line and a pixel of the key line at the same row as the pixel of the marked line is calculated as a correlation value between the marked line and the key line. Thus, when the correlation value takes a minimum value, the correlation between the marked line and the key line becomes maximum.

After the processing at step S15, the processing operation proceeds to step S16, and in the line correlation calculating section 46, the marked line is rotated by one pixel toward the left direction. The processing operation proceeds to step S17, and it is judged whether, since the marked line is rotated at step S16, each pixel of the marked line after the rotation is returned to the position of each pixel of the marked line stored in the frame memory 41.

At step S17, in the case where it is judged that each pixel of the marked line after the rotation is not returned to the position of each pixel of the marked line stored in the frame memory 41, the processing operation returns to step S15. Then a correlation value between the marked line after the rotation and the key line is calculated and the same processing is subsequently repeated.

At step S17, in the case where it is judged that each pixel of the marked line after the rotation is returned to the position of each pixel of the marked line stored in the frame memory 41, the processing operation proceeds to step S18. In the rotation amount determining section 48, based on the correlation value supplied from the line correlation calculating section 46, a maximum value of correlation between the marked line and the key line is detected, and a rotation amount of the marked line when the maximum value is obtained is determined as a determined rotation amount. The rotation amount determining section 47 supplies the determined rotation amount to the line slide section 48, and outputs it as a decoded result of the additional information embedded in the marked line, and the processing operation proceeds to step S19.

At step S19, in the line slide section 48, the marked line stored in the frame memory 41 is rotated toward the left direction similar to the case of the line correlation calculating section 46 by the rotation amount supplied from the rotation amount determining section 47. The line slide section 48 reads out the marked line after the rotation toward the left direction, and outputs it as a decoded result of the marked line, and the processing operation proceeds to step S20.

At step S20, it is judged whether or not an embedded image which has not been processed is stored in the frame memory 41. In the case where such an image is stored in the frame memory 41, the processing operation returns to step S11, and for example, a line below the marked line by one line or a first line of a frame of a new embedded image is read out as a new marked line, and the same processing is repeated subsequently.

At step S20, in the case where it is judged that an embedded image which has not been processed is not stored in the frame memory 41, the decoding processing is ended.

As described above, according to the embedded encoder 3 and the decoder 6 of the present invention, since coded data as an image in which additional information has been embedded is decoded into the original image and the additional information by using the correlation of images, even if an overhead for decoding is not provided, the coded data can be decoded into the original image and the additional information. Thus, the decoded image does not suffer deterioration in picture quality due to embedding of the additional information.

In this embodiment, although the sum of or the sum of the squares of the differences between corresponding pixels is used as a correlation value between the marked line and the key line, a correlation value is not limited to this.

In this embodiment, since one line is structured so as to be rotated in accordance with a piece of additional information, it is possible to embed additional information with a value within the range of the number of pixels constituting one line. Embedding of additional information with a value in the range larger than the number of pixels constituting one line is possible by adopting such a structure that a plurality of lines, for example, two lines are rotated in accordance with a piece of additional information.

Figure 15A:
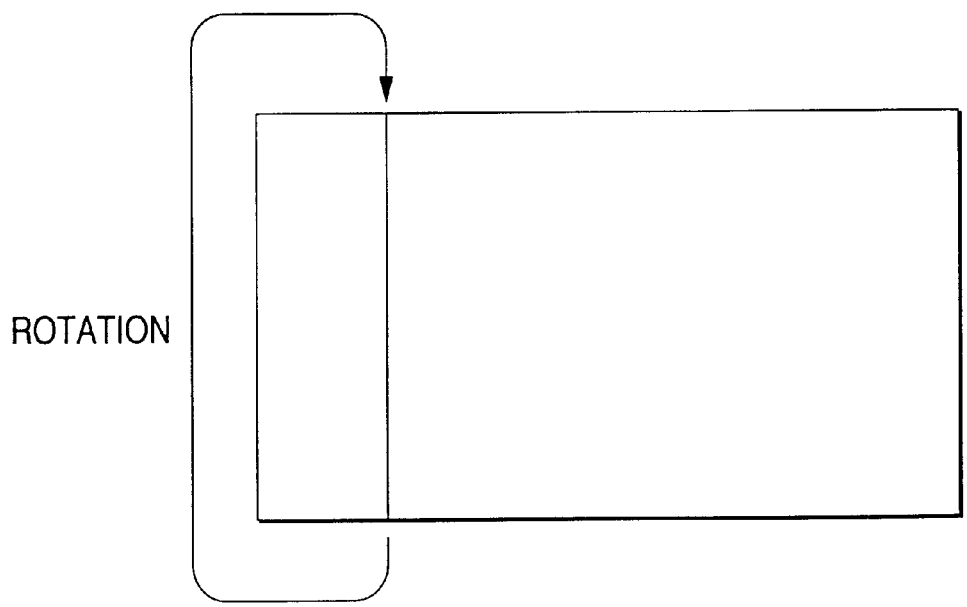
FIG. 15A is a view showing an example in which a rotation operation is performed in a vertical direction of an image.
Figure 15B:
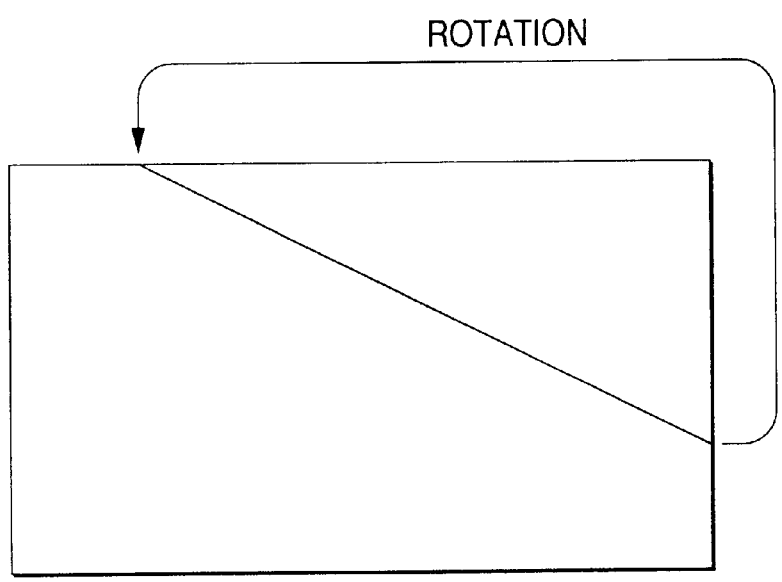
FIG. 15B is a view showing an example in which a rotation operation is performed in an oblique direction of an image.

In this embodiment, a line of pixels of an image arranged in the horizontal direction is rotated in accordance with additional information. However, for example, as shown in FIG. 15A, it is also possible that the arrangement of pixels of an image in the vertical direction is rotated, or as shown in FIG. 15B, the arrangement of pixels of an image in an oblique direction is rotated. It is also possible to modify such that the arrangement of pixels at the same position in a predetermined number of frames arranged in a time direction is rotated, or rotation is performed toward at least two directions of the horizontal direction, vertical direction, oblique direction, and time direction at the same time.

In this embodiment, although only the first line of each frame is not rotated, it is also possible that, for example, only the lowermost line is made not to be rotated. In this case, in the decoding processing, a marked line is decoded in sequence from a line of a lower row by using a line lower than the marked line by one line as a key line.

It is also possible that lines of each frame are made not to be rotated every two lines. In this case, in the decoding processing, a rotated marked line is decoded with lines above and below the marked line as key lines, so that it is decoded more accurately.

In this embodiment, although a marked line is decoded by using only a line above the marked line by one line as a key line, it is also possible that for example, two or more lines above the marked line are made key lines.

Although it takes a time to perform calculation, it is also possible to structure such that a key line is not provided but rotation is performed to all lines.

The additional information is not particularly limited, and for example, an image, a sound, a text, a computer program, a control signal, or other data may be used. If a part of an image of the image database 1 is additional information and a remaining image is supplied to the frame memory 31, the part of the image as the additional information is embedded i n the remaining image portion, so that compression of the image is realized.

Although the embodiment of the present invention is expressed with images, it is also possible to structure such that a data line of sound for a predetermined time is rotated.

Although this embodiment is structured such that under the control of the CPU 32 or 42, a computer program is executed so that the embedding coding processing or decoding processing is carried out, the processing may be carried out by dedicated hardware.

In this embodiment, although a computer program executed under the control of the CPU 32 or 42 is stored in the program memory 33 or 43, the computer program may be provided as a signal through a recording medium such as a semiconductor memory, a magnetic tape, a magnetic disc, an optical disc, a magneto-optical disc, or a phase change disc, or through a transmission medium such as the Internet, a ground wave, a satellite channel, a public network, or a CATV (cable television) network.

Figure 16A:
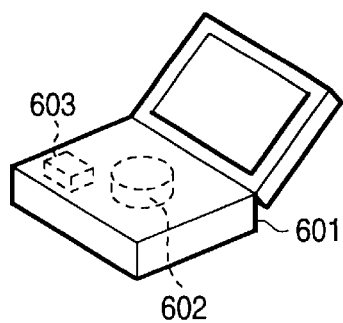
FIG. 16A is a view showing a computer in which a program for causing execution of processing of the present invention is installed.
Figure 16B:
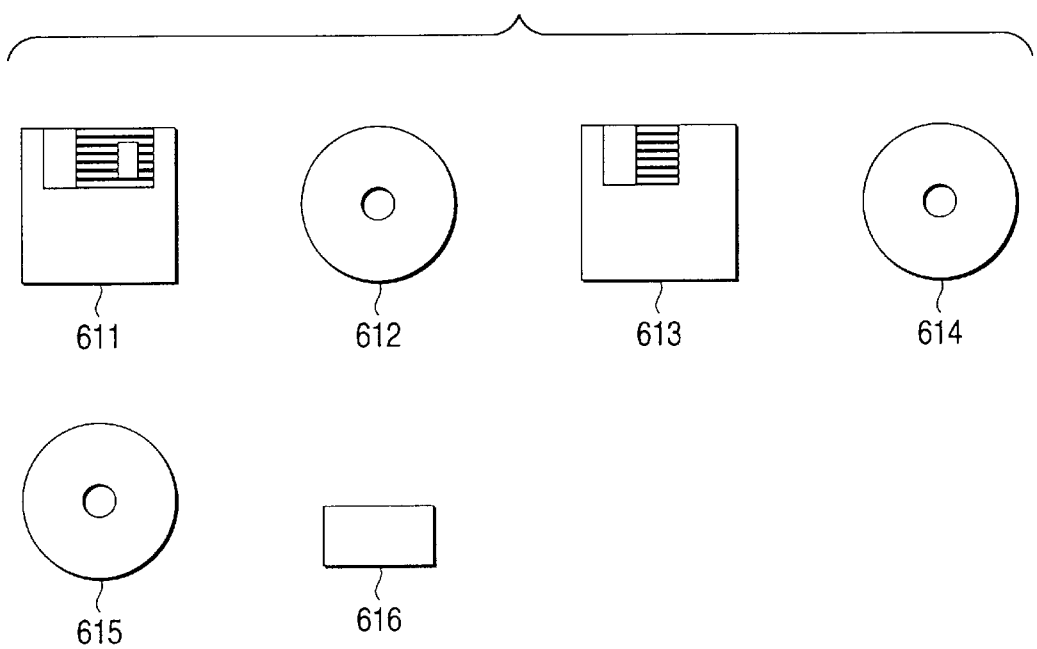
FIG. 16B is a view showing examples of storage media in which a program for causing execution of processing of the present invention is stored.
Figure 16C:
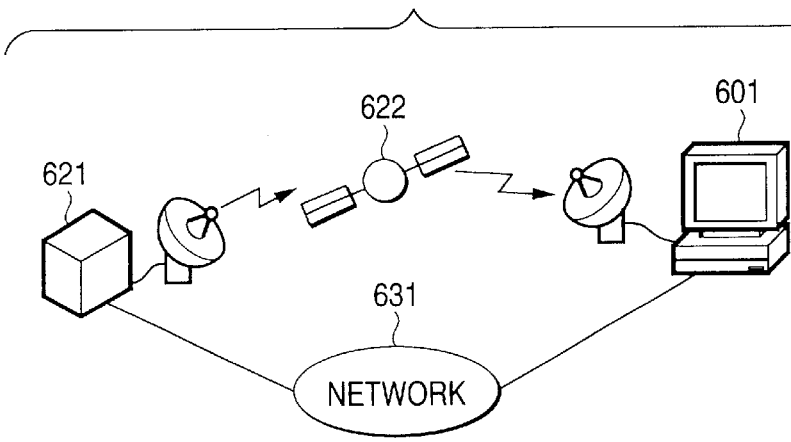
FIG. 16C is a view showing a conception in which a program for causing execution of processing of the present invention is distributed in a computer through a satellite or a network.

With reference to FIG. 16A, FIG. 16B and FIG. 16C, a description will be made on a recording medium recorded with a computer program, which is used so that the foregoing computer program is installed into the computer and is made a state in which it can be executed by the computer, and on a signal supplied to the computer through a transmission medium.

As shown in FIG. 16A, a program is previously recorded in a hard disc 602 or a semiconductor memory 603 as a built-in recording medium in a computer 601.

Alternatively, as shown in FIG. 16B, a program is temporarily or permanently recorded in a recording medium, such as a floppy disc 611, a CD-ROM (Compact Disc Read-only memory) 612, an MO (Magneto-optical) disc 613, a DVD (Digital Versatile Disc) 614, a magnetic disc 615, or a semiconductor memory 616.

In addition to the case where a program is installed from the foregoing recording medium into the computer, as shown in FIG. 16C, it is possible to structure such that the program is transmitted to the computer 601 from a download site 621 by wireless through an artificial satellite 622 for digital satellite broadcasting, or is transmitted to the computer 601 with wire line through a network 631 such as a LAN (Local Area Network) or the Internet, so that it is installed into the built-in hard disc 602 in the computer 601.

Steps described through the program for performing various kinds of processing according to the present invention are not necessarily processed in time series along the sequence set forth as a flowchart, but they include also a processing executed in parallel or individually, for example, a parallel processing or processing by an object.

Figure 17:
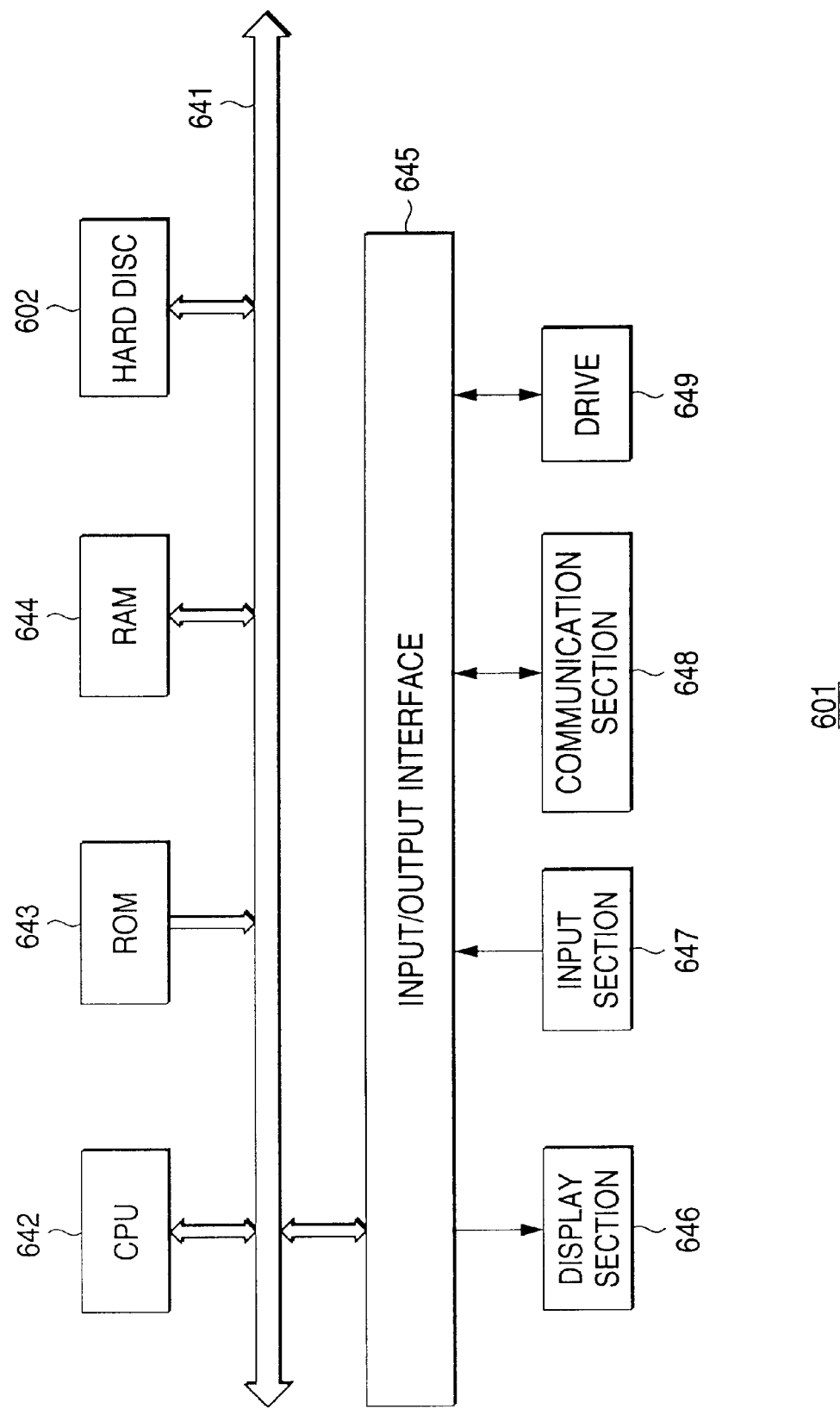
FIG. 17 is a block diagram of an example of a computer in which a program for causing execution of processing of the present invention is installed.

FIG. 17 shows a structural example of the computer 601 of FIG. 16A and FIG. 16C.

As shown in FIG. 17, the computer 601 has a built-in CPU (Central Processing Unit) 642. An input/output interface 645 is connected to the CPU 642 through a bus 641. When an instruction is inputted through the input/output interface 645 by a user's operation to an input section 647 constituted by a keyboard, a mouse, etc., the CPU 642 executes a program stored in a ROM (Read-only memory) 643 corresponding to the semiconductor memory 603 of FIG. 16A in accordance with the instruction. The flowchart shown in FIG. 8 or FIG. 14 is executed as this program. Alternatively, the CPU 642 loads a program stored in the hard disc 602, a program which was transmitted from the satellite 622 or the network 631, was received by a communication section 648, and was installed in the hard disc 602, or a program which read out from the floppy disc 611, the CD-ROM 612, the MO disc 613, the DVD 614, the magnetic disc 615, or the semiconductor memory 616 mounted on a drive 649 and was installed in the hard disc 602, into a RAM (Random access memory) 644 and executes the program. The CPU 642 outputs a processing result through, for example, the input/output interface 645 to a display section 646 constituted by an LCD (Liquid Crystal Display) as the need arises.

What is claimed is:

1. A coding apparatus for coding first data in accordance with second data, said first data being image data of a plurality of pixels, said apparatus comprising:

storage means for storing at least partial data of said first data, said at least partial data comprising a series of pixel data arranged in a predetermined direction on said first image data; and coding means for embedding data in relation to said second data into said first data by rotating said at least partial data stored in said storage means in accordance with said second data;

wherein said coding means performs a rotation operation of said series of pixel data stored in said storage means toward said predetermined direction in accordance with said second data, said first image data being rotated in proportion to the number of pixels corresponding to a value of said second data toward said predetermined direction, so that said data in relation to said second data is embedded in said first image data.

2. A coding method for coding first data in accordance with second data, said first data being image data of a plurality of pixels, said method comprising:

a storing step of storing at least partial data of said first data, in which a series of pixel data arranged in a predetermined direction on said first image data is stored; and a coding step of embedding data in relation to said second data into said first data by rotating said stored at least partial data in accordance with said second data;

wherein in said coding step, a rotation operation of said stored series of pixel data is performed toward said predetermined direction in accordance with said second data, said first image data being rotated in proportion to the number of pixels corresponding to a value of said second data toward said predetermined direction, so that said data in relation to said second data is embedded in said first image data.

3. A decoding apparatus for decoding coded data in which first data has been coded in accordance with second data, comprising:

rotation means for rotating at least partial data of said coded data;

correlation calculating means for calculating a correlation between said at least partial data rotated by said rotation means and peripheral data of said at least partial data;

second data decoding means for decoding said second data embedded in said coded data by determining a rotation amount of said at least partial data of said coded data rotated by said rotation means based on said correlation obtained by said correlation calculating means; and first data decoding means for decoding said coded data to said original first data in accordance with said rotation amount determined by said second data decoding means.

4. The decoding apparatus according to claim 3, wherein said second data decoding means obtains a plurality of correlations between said at least rotated partial data and said peripheral data of said at least partial data for every different value of said rotation amount, and determines said rotation amount when said correlation is maximum.

5. The decoding apparatus according to claim 3, wherein said first data is image data composed of a plurality of pixel data, and said rotation means rotates pixel data of one line arranged in a horizontal direction on said coded data toward said horizontal direction.

6. The decoding apparatus according to claim 3, wherein rotation by said rotation means is prohibited in a part of said coded data.

7. The decoding apparatus according to claim 3, wherein said second data decoding means determines a rotation amount of said at least partial data of said coded data rotated by said rotation means, and makes a value corresponding to said rotation amount said second data.

8. A decoding method for decoding coded data in which first data has been coded in accordance with second data, comprising:

a step of rotating at least partial data of said coded data;

a step of calculating a correlation between said rotated at least partial data and peripheral data of said at least partial data;

a step of decoding said second data embedded in said coded data by determining a rotation amount of said at least partial data of said coded data rotated in said rotating step based on said correlation; and a step of decoding said coded data to said original first data in accordance with said determined rotation amount.

9. The decoding method according to claim 8, wherein in said step of decoding said second data, a plurality of correlations between said rotated at least partial data and said peripheral data of said at least partial data are obtained for every different value of said rotation amount, and said rotation amount when said correlation is maximum is determined.

10. The decoding method according to claim 8, wherein said first data is image data composed of a plurality of pixel data, and
in said rotating step, pixel data of one line arranged in a horizontal direction on said coded data is rotated toward said horizontal direction.

11. The decoding method according to claim 8, wherein rotation in said rotating step is prohibited in a part of said coded data.

12. The decoding method according to claim 8, wherein in said step of decoding said second data, a rotation amount of said at least partial data of said coded data rotated in said rotating step is determined, and a value corresponding to said rotation amount is made said second data.

13. A data processing system for coding first data in accordance with second data and for decoding said coded data, comprising:
storage means for storing at least partial data of said first data;
coding means for embedding data in relation to said second data into said first data by rotating said at least partial data stored in said storage means in accordance with said second data;
rotation means for rotating said at least partial data of said coded data;
correlation calculating means for calculating a correlation between said at least partial data rotated by said rotation means and peripheral data of said at least partial data;
second data decoding means for decoding said second data embedded in said coded data by determining a rotation amount of said at least partial data of said coded data rotated by said rotation means based on said correlation obtained by said correlation calculating means; and
first data decoding means for decoding said coded data to said original first data in accordance with said rotation amount determined by said second data decoding means.

14. A storage medium storing a computer-controllable program for coding first data in accordance with second data, said first data being image data of a plurality of pixels, said program comprising:
a storing step of storing at least partial data of said first data, in which a series of pixel data arranged in a predetermined direction on said first image data is stored; and
a coding step of embedding data in relation to said second data into said first data by rotating said stored at least partial data in accordance with said second data;
wherein in said coding step, a rotation operation of said stored series of pixel data is performed toward said predetermined direction in accordance with said second data, said first image data being rotated toward said predetermined direction in proportion to an amount corresponding to a value of said second data, so that said data in relation to said second data is embedded in said first image data.

15. The storage medium storing a computer-controllable program for decoding coded data in which first data has been coded in accordance with second data, said program comprising:
a step of rotating at least partial data of said coded data;
a step of calculating a correlation between said rotated at least partial data and peripheral data of said at least partial data;
a step of decoding said second data embedded in said coded data by determining a rotation amount of said at least partial data of said coded data rotated in said rotating step based on said correlation; and
a step of decoding said coded data to said original first data in accordance with said determined rotation amount.

16. The storage medium according to claim 15, wherein in said step of decoding said second data, a plurality of correlations between said rotated at least partial data and said peripheral data of said at least partial data are obtained for every different value of said rotation amount, and said rotation amount when said correlation is maximum is determined.

17. The storage medium according to claim 15, wherein said first data is image data composed of a plurality of pixel data, and
in said rotating step, pixel data of one line arranged in a horizontal direction on said coded data is rotated toward said horizontal direction.

18. The storage medium according to claim 15, wherein rotation in said rotating step is prohibited in a part of said coded data.

19. The storage medium according to claim 15, wherein in said step of decoding said second data, a rotation amount of said at least partial data of said coded data rotated in said rotating step is determined, and a value corresponding to said rotation amount is made said second data.

20. A signal including a computer-controllable program for coding first data in accordance with second data, said first data being image data of a plurality of pixels, said program comprising:
a step of storing at least partial data of said first data, in which a series of pixel data arranged in a predetermined direction on said first image data is stored; and
a coding step of embedding data in relation to said second data into said first data by rotating said stored at least partial data in accordance with said second data;
wherein in said coding step, a rotation operation of said stored series of pixel data is performed toward said predetermined direction in accordance with said second data, said first image data being rotated toward said predetermined direction in proportion to an amount corresponding to a value of said second data, so that said data in relation to said second data is embedded in said first image data.

21. The signal including a decoding method for decoding coded data in which first data has been coded in accordance with second data, said decoding method comprising:
a step of rotating at least partial data of said coded data;
a step of calculating a correlation between said rotated at least partial data and peripheral data of said at least partial data;
a step of decoding said second data embedded in said coded data by determining a rotation amount of said at least partial data of said coded data rotated in said rotating step based on said correlation; and
a step of decoding said coded data to said original first data in accordance with said determined rotation amount.

22. The signal according to claim 21, wherein in said step of decoding said second data, a plurality of correlations between said rotated at least partial data and said peripheral data of said at least partial data are obtained for every different value of said rotation amount, and said rotation amount when said correlation is maximum is determined.

23. The signal according to claim 21, wherein said first data is image data composed of a plurality of pixel data, and
in said rotating step, pixel data of one line arranged in a horizontal direction on said coded data is rotated toward said horizontal direction.

24. The signal according to claim 21, wherein rotation in said rotating step is prohibited in a part of said coded data.

25. The signal according to claim 21, wherein in said step of decoding said second data, a rotation amount of said at least partial data of said coded data rotated in said rotating step is determined, and a value corresponding to said rotation amount is made said second data.

26. A signal including first data coded in accordance with second data through a computer-controllable program, said first data being image data of a plurality of pixels, said program comprising:
a step of storing at least partial data of said first data, by storing a series of pixel data arranged in a predetermined direction on said first image data; and
a coding step of embedding data in relation to said second data into said first data by rotating said stored at least partial data in accordance with said second data;
wherein in said coding step, a rotation operation of said stored series of pixel data is performed toward said predetermined direction in accordance with said second data, said first image data being rotated toward said predetermined direction in proportion to an amount corresponding to a value of said second data, so that said data in relation to said second data is embedded in said first image data.

* * * * *